(12) United States Patent
Wen et al.

(10) Patent No.: US 9,332,481 B2
(45) Date of Patent: May 3, 2016

(54) WIRELESS COMMUNICATION SYSTEM, WIRELESS COMMUNICATION METHOD, TRANSMITTING TERMINAL, AND RECEIVING TERMINAL

(71) Applicant: FUJITSU LIMITED, Kawasaki-shi, Kanagawa (JP)

(72) Inventors: Yun Wen, Kawasaki (JP); Kazuyuki Ozaki, Yokohama (JP); Hiroshi Fujita, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 359 days.

(21) Appl. No.: 14/017,997

(22) Filed: Sep. 4, 2013

(65) Prior Publication Data

US 2014/0140230 A1 May 22, 2014

(30) Foreign Application Priority Data

Nov. 19, 2012 (JP) ................................. 2012-252978

(51) Int. Cl.
*H04W 4/00* (2009.01)
*H04W 40/12* (2009.01)
*H04W 84/18* (2009.01)
*H04W 88/04* (2009.01)
*H04W 74/08* (2009.01)

(52) U.S. Cl.
CPC .......... *H04W 40/12* (2013.01); *H04W 74/0808* (2013.01); *H04W 84/18* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 7,139,262 B1 * | 11/2006 | Elliott | 370/351 |
| 7,171,476 B2 * | 1/2007 | Maeda et al. | 709/227 |
| 7,177,295 B1 * | 2/2007 | Sholander et al. | 370/338 |
| 7,319,674 B2 * | 1/2008 | Chandra et al. | 370/252 |
| 7,532,598 B2 * | 5/2009 | Choi et al. | 370/332 |
| 7,561,024 B2 * | 7/2009 | Rudnick | 340/286.01 |

(Continued)

FOREIGN PATENT DOCUMENTS

| | | |
|---|---|---|
| JP | 2006-005812 | 1/2006 |
| JP | 2006-197483 | 7/2006 |

(Continued)

OTHER PUBLICATIONS

USPTO, [Nguyen] Non-Final Rejection mailed on Nov. 4, 2015, in related U.S. Appl. No. 14/018,972 [pending].

*Primary Examiner* — Steven H Nguyen
(74) *Attorney, Agent, or Firm* — Fujitsu Patent Center

(57) ABSTRACT

A wireless communication system constitutes a wireless ad hoc network. A plurality of wireless terminals include a receiving terminal and a plurality of the transmitting terminals. Each of the transmitting terminals executes direct communication or indirect communication. The wireless communication system includes a first obtainer that obtains a reception side terminal number which is the number of the wireless terminals with which the receiving terminal is able to communicate directly, a second obtainer that obtains a transmission side terminal number which is the number of the wireless terminals with which a target transmitting terminal, which is one of the plurality of transmitting terminals, is able to communicate directly, and a setter that selects one of the direct communication and the indirect communication based on the reception side terminal number and the transmission side terminal number, and sets the target transmitting terminal so as to execute the selected communication.

18 Claims, 13 Drawing Sheets

(56) References Cited

U.S. PATENT DOCUMENTS

| | | | |
|---|---|---|---|
| 7,804,803 B2* | 9/2010 | Perumal et al. | 370/338 |
| 8,036,207 B2* | 10/2011 | Sivakumar et al. | 370/351 |
| 8,050,196 B2* | 11/2011 | Yoon | 370/255 |
| 8,064,377 B2* | 11/2011 | Yi et al. | 370/312 |
| 2002/0145978 A1* | 10/2002 | Batsell et al. | 370/238 |
| 2004/0003111 A1* | 1/2004 | Maeda et al. | 709/237 |
| 2005/0078678 A1* | 4/2005 | Kim et al. | 370/390 |
| 2008/0013502 A1* | 1/2008 | Clark | 370/338 |
| 2008/0317047 A1* | 12/2008 | Zeng et al. | 370/401 |
| 2009/0161578 A1* | 6/2009 | Yeung et al. | 370/254 |
| 2011/0007669 A1* | 1/2011 | Yoon | 370/255 |

FOREIGN PATENT DOCUMENTS

| | | |
|---|---|---|
| JP | 2007-235828 | 9/2007 |
| JP | 2008-042922 | 2/2008 |
| JP | 2008-085924 | 4/2008 |
| JP | 2008-227854 | 9/2008 |

* cited by examiner

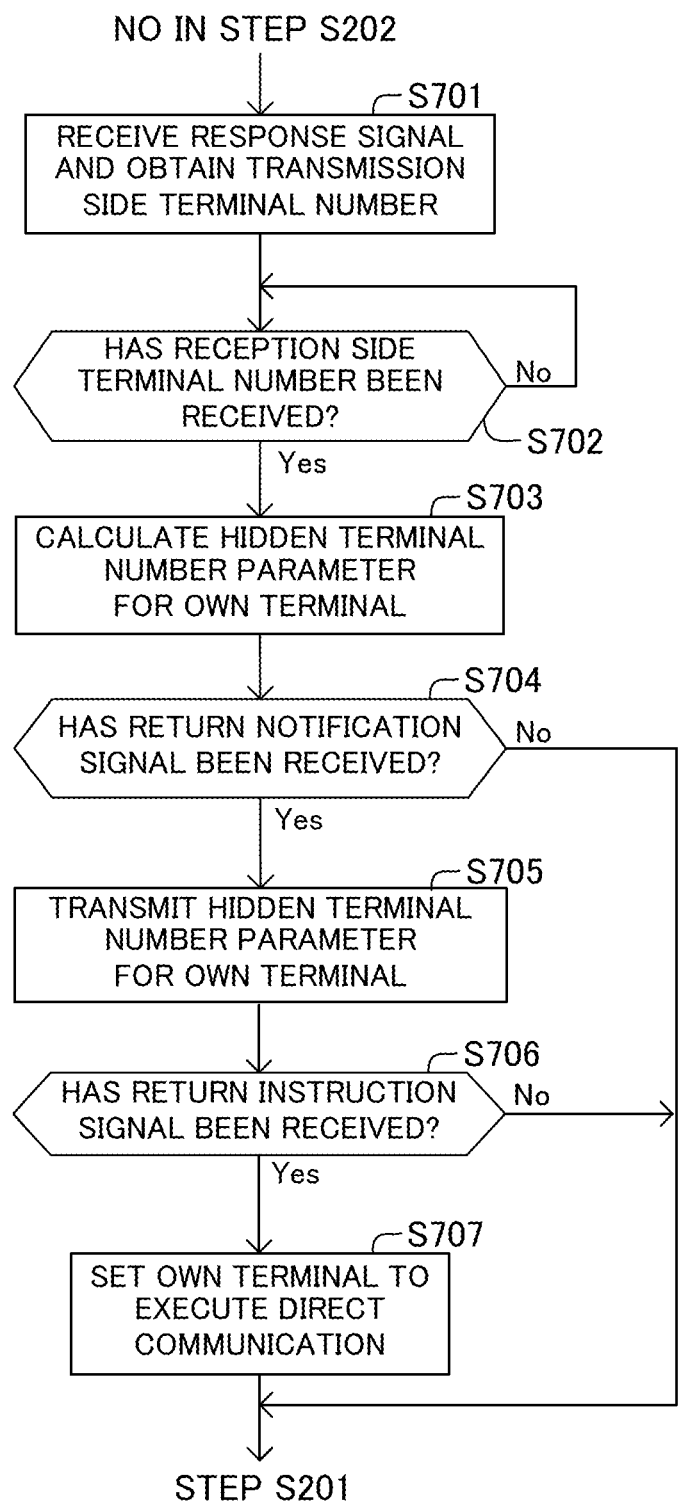

WIRELESS COMMUNICATION SYSTEM, WIRELESS COMMUNICATION METHOD, TRANSMITTING TERMINAL, AND RECEIVING TERMINAL

CROSS-REFERENCE TO RELATED APPLICATION

This application is based upon and claims the benefit of priority of the prior Japanese Patent Application No. 2012-252978, filed on Nov. 19, 2012, the entire contents of which are incorporated herein by reference.

FIELD

The present invention relates to a wireless communication system, a wireless communication method, a transmitting terminal, and a receiving terminal.

BACKGROUND

Wireless communication systems including a plurality of wireless terminals constituting a wireless ad hoc network have been known. In this type of wireless communication systems, each wireless terminal is mostly configured to perform wireless communication with another wireless terminal according to a Carrier Sense Multiple Access with Collision Avoidance (CSMA/CA) scheme.

In the CSMA/CA scheme, each wireless terminal performs carrier sense before performing communication. The carrier sense is a process of detecting whether or not there is a radio signal transmitted from another wireless terminal through a frequency used to perform wireless communication. Then, each wireless terminal performs wireless communication through the frequency when there is no radio signal transmitted from another wireless terminal. For example, the CSMA/CA scheme is employed in IEEE802.11.

Meanwhile, it is assumed that there are a second wireless terminal and a third wireless terminal which are able to communicate with a first wireless terminal, and the second wireless terminal and the third wireless terminal are unable to communicate with each other. For example, when an obstacle is present between the second wireless terminal and the third wireless terminal, the above-mentioned situation may occur.

In this case, when the third wireless terminal performs the carrier sense while the second wireless terminal is in the process of transmitting a radio signal to the first wireless terminal, it is difficult for the third wireless terminal to detect the presence of the radio signal transmitted from the second wireless terminal. For this reason, the third wireless terminal also starts to transmit a radio signal to the first wireless terminal. As a result, a collision of the radio signals occurs in the first wireless terminal, and the quality of the radio signal received by the first wireless terminal deteriorates.

This problem is referred to as a hidden terminal problem. The hidden terminal problem may cause communication efficiency to degrade. Particularly, in a wireless communication system in which a certain wireless terminal (receiving terminal) receives information from a relatively large number of wireless terminals (transmitting terminals), since a collision of the radio signals frequently occurs in the receiving terminal, the communication efficiency is likely to degrade due to the hidden terminal problem.

In order to solve this problem, first to third techniques have been known (for example, see Patent Literature 1 (Japanese Laid-open Patent Publication No. 2008-85924), Patent Literature 2 (Japanese Laid-open Patent Publication No. 2006-5812), Patent Literature 3 (Japanese Laid-open Patent Publication No. 2006-197483) and Patent Literature 4 (Japanese Laid-open Patent Publication No. 2008-227854)). The first technique is a technique of determining a communication path based on received signal strength indication (RSSI) of a radio signal transmitted from another wireless terminal.

The second technique is a technique in which each wireless terminal transmits a list of wireless terminals which are able to communicate with its own terminal to a wireless base station, and the wireless base station divides the wireless terminals into groups based on the list so that a collision of radio signals does not occur and performs transmission control for each group. The third technique is a technique in which each wireless terminal obtains a parameter representing a communication quality for each wireless terminal which is able to communicate with its own terminal, and determines a communication path based on the obtained parameter.

Meanwhile, it is assumed that there are a second wireless terminal, a third wireless terminal, and a fourth wireless terminal which are able to communicate with a first wireless terminal, the second wireless terminal is unable to communicate with the third wireless terminal and the fourth wireless terminal, and the third wireless terminal and the fourth wireless terminal are able to communicate with each other.

In this case, among wireless terminals which are able to communicate directly with the first wireless terminal, a hidden terminal number which is the number of wireless terminals which are unable to communicate directly with the second wireless terminal is 2. Meanwhile, among wireless terminals which are able to communicate directly with the first wireless terminal, a hidden terminal number which is the number of wireless terminals which are unable to communicate directly with the third wireless terminal is 1. Thus, the hidden terminal number for the second wireless terminal is different from the hidden terminal number for the third wireless terminal.

However, when the second wireless terminal and the third wireless terminal are located at the same position from the first wireless terminal, the second wireless terminal and the third wireless terminal are the same in the RSSI of a radio signal transmitted from the first wireless terminal. That is, there are cases in which the RSSI does not reflect the hidden terminal number. Thus, when a communication path is determined based on the RSSI, a collision of radio signals is likely to frequently occur in the first wireless terminal (receiving terminal).

Further, when each wireless terminal determines a communication path based on information (for example, an identifier identifying a wireless terminal or a parameter representing a communication quality) of each wireless terminal capable of communicating with its own terminal, a load (for example, a processing load needed for determining a communication path or a communication load needed to communicate the information) is likely to excessively increase.

As described above, in the related arts, there is a problem in that it is difficult to increase communication efficiency without an excessive increase in a load.

SUMMARY

According to an aspect of the embodiments, a wireless communication system is a system including a plurality of wireless terminals constituting a wireless ad hoc network. The plurality of wireless terminals includes a receiving terminal and a plurality of transmitting terminals. Each of the plurality of transmitting terminals is configured to execute direct communication in which information is transmitted directly to the receiving terminal or indirect communication in which the information is transmitted indirectly to the receiving terminal through at least one other wireless terminal. The wireless communication system includes a reception side terminal number obtainer that obtains a reception side terminal number which is the number of the wireless terminals with which the receiving terminal is able to communicate directly, a transmission side terminal number obtainer that obtains a transmission side terminal number which is the number of the wireless terminals with which a target transmitting terminal, which is one of the plurality of transmitting terminals, is able to communicate directly, and a setter that selects one of the direct communication and the indirect communication based on the reception side terminal number and the transmission side terminal number, and sets the target transmitting terminal so as to execute the selected communication.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a flowchart illustrating a process executed by the transmitting terminal according to the fourth embodiment.

DESCRIPTION OF EMBODIMENTS

Hereinafter, in order to solve the above-described problems, exemplary embodiments of a wireless communication system, a wireless communication method, a transmitting terminal, a receiving terminal, a control method, and a control program according to the present invention will be described with reference to FIGS. 1 to 13.

<First Embodiment>
(Outline)

A wireless communication system according to a first embodiment includes a plurality of wireless terminals constituting a wireless ad hoc network. The plurality of wireless terminals includes a receiving terminal and a plurality of transmitting terminals. Each of the plurality of transmitting terminals executes direct communication in which information is transmitted directly to the receiving terminal or indirect communication (non-direct communication) in which information is transmitted indirectly to the receiving terminal through at least one other transmitting terminal.

The receiving terminal transmits a response request signal. When the response request signal is received, the transmitting terminal transmits a response signal. The receiving terminal receives the response signal, and obtains a reception side terminal number which is the number of transmitting terminals with which receiving terminal is able to communicate. Further, each transmitting terminal receives the response signals transmitted from other transmitting terminal, and obtains a transmission side terminal number which is the number of transmitting terminals with which its own terminal is able to communicate directly.

Then, the receiving terminal transmits the obtained reception side terminal number. When the reception side terminal number is received, each transmitting terminal selects the direct communication or the indirect communication based on the reception side terminal number and the transmission side terminal number, and sets its own terminal to execute the selected communication.

Accordingly, it is possible to increase the communication efficiency while avoiding an excessive increase in a load.

Next, the first embodiment will be described in detail.

(Configuration)

Figure 1:
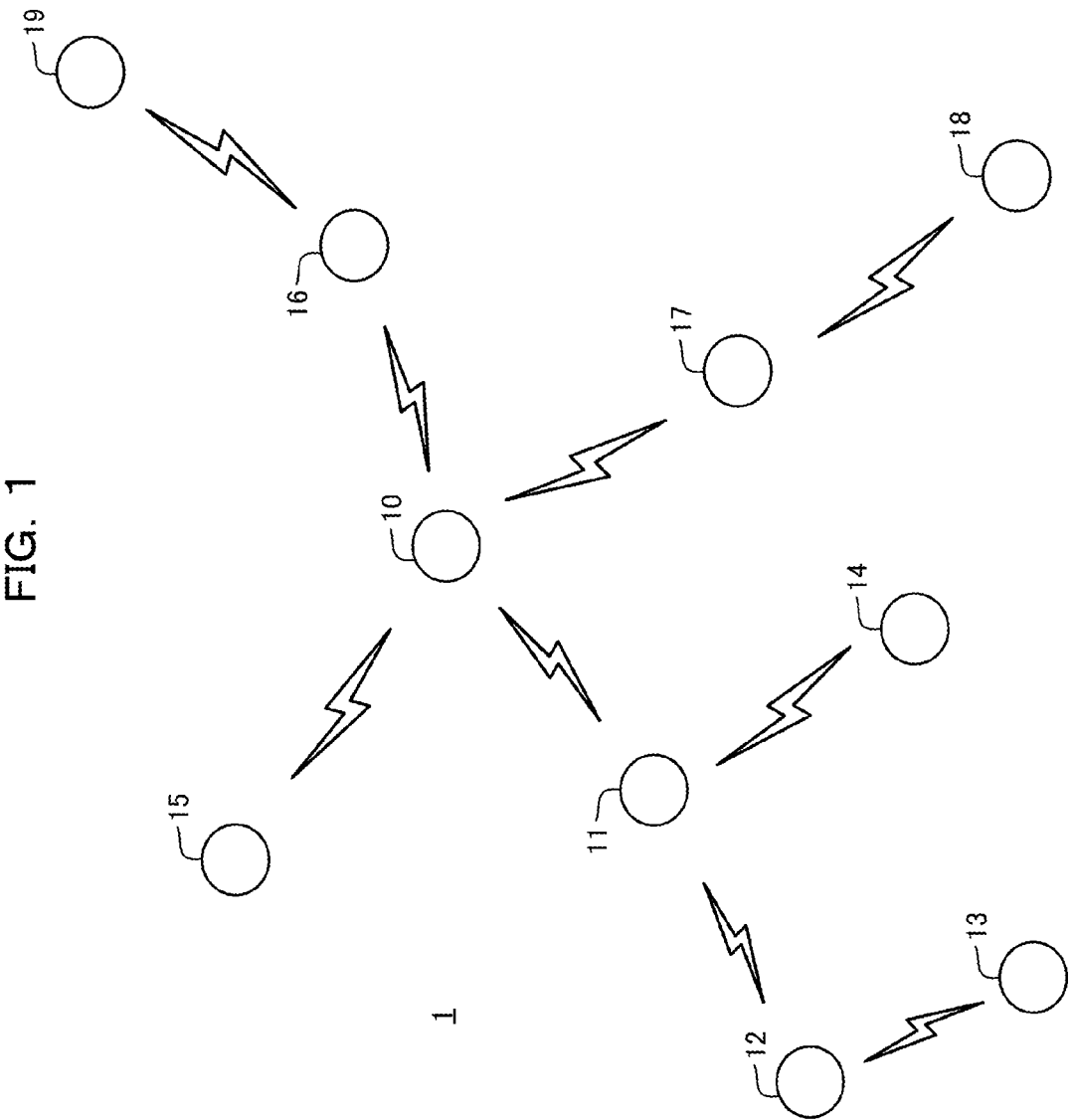
FIG. 1 is a diagram illustrating a configuration of a wireless communication system according to a first embodiment.

As illustrated in FIG. 1, a wireless communication system 1 according to the first embodiment includes a plurality of (10 in this example) wireless terminals (wireless nodes) 10, 11, . . . , and 19. Note that, the wireless communication system 1 may comprise an arbitrary number (three or more) of wireless terminals.

The wireless communication system 1 constitutes a wireless ad hoc network. In this example, the wireless communication system 1 is configured to perform multi-hop communication. Note that, the wireless communication system 1 may be configured to perform only single-hop communication. Further, in this example, the wireless communication system 1 constitutes a wireless sensor network (WSN).

Note that, the wireless communication system 1 may constitute a wireless ad hoc network other than the wireless sensor. In this case, physical quantity information which will be described below may be interpreted as information of a transmission target.

Each of the plurality of the wireless terminals 10, 11, . . . , and 19 is configured to execute wireless communication with other wireless terminals 10, 11, . . . , and 19 located within a range (for example, a range in which strength (received field strength) of a received radio signal is equal to or more than a certain (given) reference value) in which a radio signal can be transmitted or received).

In this example, the wireless terminal 10 is an example of the receiving terminal and also referred to as a receiving terminal. Each of the wireless terminals 11, 12, . . . , and 19 is an example of the transmitting terminal and also referred to as a transmitting terminal. Note that, the wireless communication system 1 may include a plurality of receiving terminals.

Each of the transmitting terminals 11, 12, . . . , and 19 is configured to execute direct communication or indirect communication. In this example, the direct communication refers to communication in which information is transmitted directly to the receiving terminal 10. In this example, the indirect communication refers to communication in which information is transmitted indirectly to the receiving terminal 10 through at least one of the other transmitting terminals 11, 12, ..., and 19.

For example, as illustrated in FIG. 1, a communication path may be set between each of the transmitting terminals 11, 12, ..., and 19 and the receiving terminal 10.

Each of the transmitting terminals 11, 15, 16, and 17 performs communication with the receiving terminal 10 by performing single-hop communication in which the hop number is 1. In other words, each of the transmitting terminals 11, 15, 16, and 17 performs the direct communication with the receiving terminal 10.

Further, each of the transmitting terminals 12 and 14 performs communication with the receiving terminal 10 through the transmitting terminal 11. In other words, each of the transmitting terminals 12 and 14 performs communication with the receiving terminal 10 by performing multi-hop communication in which the hop number is 2.

Similarly, the transmitting terminal 18 performs communication with the receiving terminal 10 through the transmitting terminal 17. In other words, the transmitting terminal 18 performs communication with the receiving terminal 10 by performing multi-hop communication in which the hop number is 2. Similarly, the transmitting terminal 19 performs communication with the receiving terminal 10 through the transmitting terminal 16. In other words, the transmitting terminal 19 performs communication with the receiving terminal 10 by performing multi-hop communication in which the hop number is 2.

Further, the transmitting terminal 13 performs communication with the receiving terminal 10 while passing through the transmitting terminal 12 and the transmitting terminal 11 in order. In other words, the transmitting terminal 13 performs communication with the receiving terminal 10 by performing multi-hop communication in which the hop number is 3.

In other words, each of the transmitting terminals 12, 13, 14, 18, and 19 performs the indirect communication with the receiving terminal 10.

The receiving terminal 10 is connected to perform communication with an information processing apparatus (not illustrated) via a communication network (not illustrated). The receiving terminal 10 receives information transmitted from each of the transmitting terminals 11, 12, ..., and 19, and transmits the received information and information generated by its own terminal to the information processing apparatus. In this example, the receiving terminal 10 functions as a gateway device.

Figure 2:
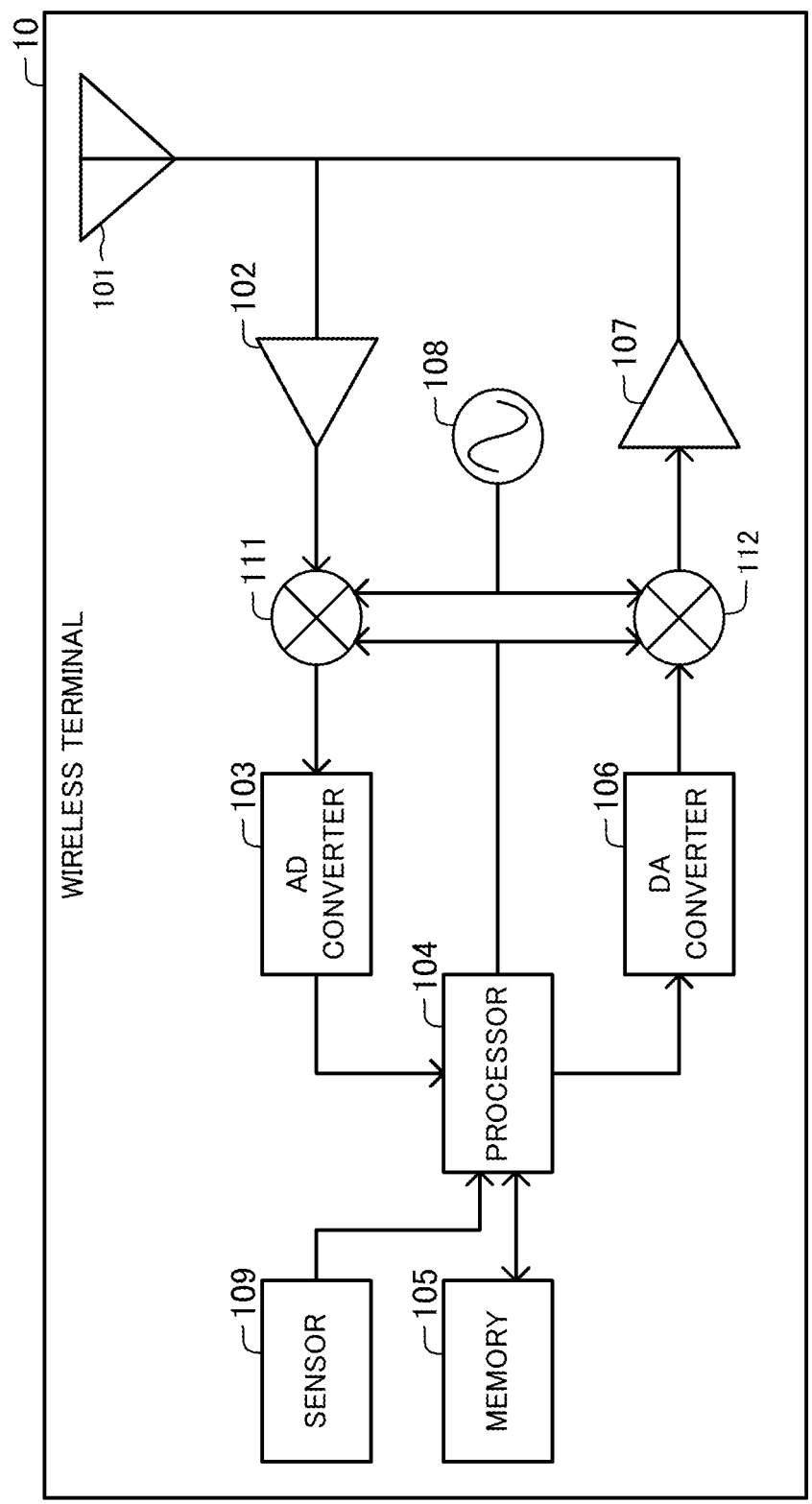
FIG. 2 is a diagram illustrating a configuration of a wireless terminal according to the first embodiment.

As illustrated in FIG. 2, the receiving terminal 10 includes an antenna 101, a first amplifier 102, an analog-to-digital (AD) converter 103, a processor 104, a memory 105, a digital-to-analog (DA) converter 106, a second amplifier 107, an oscillator 108, a sensor 109, a down converter 111, and an up converter 112.

The antenna 101 transmits an electrical signal to the external space as a radio signal (radio wave), and receives a radio signal of the external space as an electrical signal. The first amplifier 102 amplifies a signal (radio frequency (RF) signal) received by the antenna 101.

The oscillator 108 generates an alternating current (AC) signal of a continuous wave. The down converter 111 converts the RF signal into a baseband signal by converting a frequency of a RF signal using the AC signal generated by the oscillator 108. The AD converter 103 converts the baseband signal from an analog signal into a digital signal, and outputs the converted baseband signal.

The memory 105 stores a program executed by the processor 104 and data used by the processor 104 when the program is executed, and stores information in a readable/writable manner.

The processor 104 executes the program stored in the memory 105, processes the baseband signal output from the AD converter 103 and a baseband signal including physical quantity information output from the sensor 109 which will be described later, and outputs a baseband signal of a processing result. For example, the receiving terminal 10 implements functions which will be described later. Among functions which will be described later, a function of storing information is implemented by the memory 105.

The DA converter 106 converts the baseband signal output from the processor 104 from a digital signal into an analog signal. The up converter 112 converts the baseband signal into the RF signal by converting a frequency of the baseband signal using the AC signal generated by the oscillator 108.

The second amplifier 107 amplifies the RF signal so that transmission power of the RF signal matches a transmission power value set by the processor 104. The antenna 101 transmits the RF signal amplified by the second amplifier 107 to the external space as the radio signal.

The sensor 109 measures a physical quantity (for example, a temperature, humidity, acceleration, illumination, a wind direction, a wind velocity, seismic motion, rainfall, loudness, a water level, an amount of used power, an amount of used water, or an amount of used gas), and outputs a baseband signal including physical quantity information representing the measured physical quantity to the processor 104. In this example, the sensor 109 measures the physical quantity each time a certain measurement period of time elapses. Note that, the sensor 109 may be configured to measure the physical quantity each time the receiving terminal 10 receives a predetermined measurement request.

Note that, each of the transmitting terminals 11, 12, ..., and 19 has the same configuration as the receiving terminal 10.

(Function)

Figure 3:
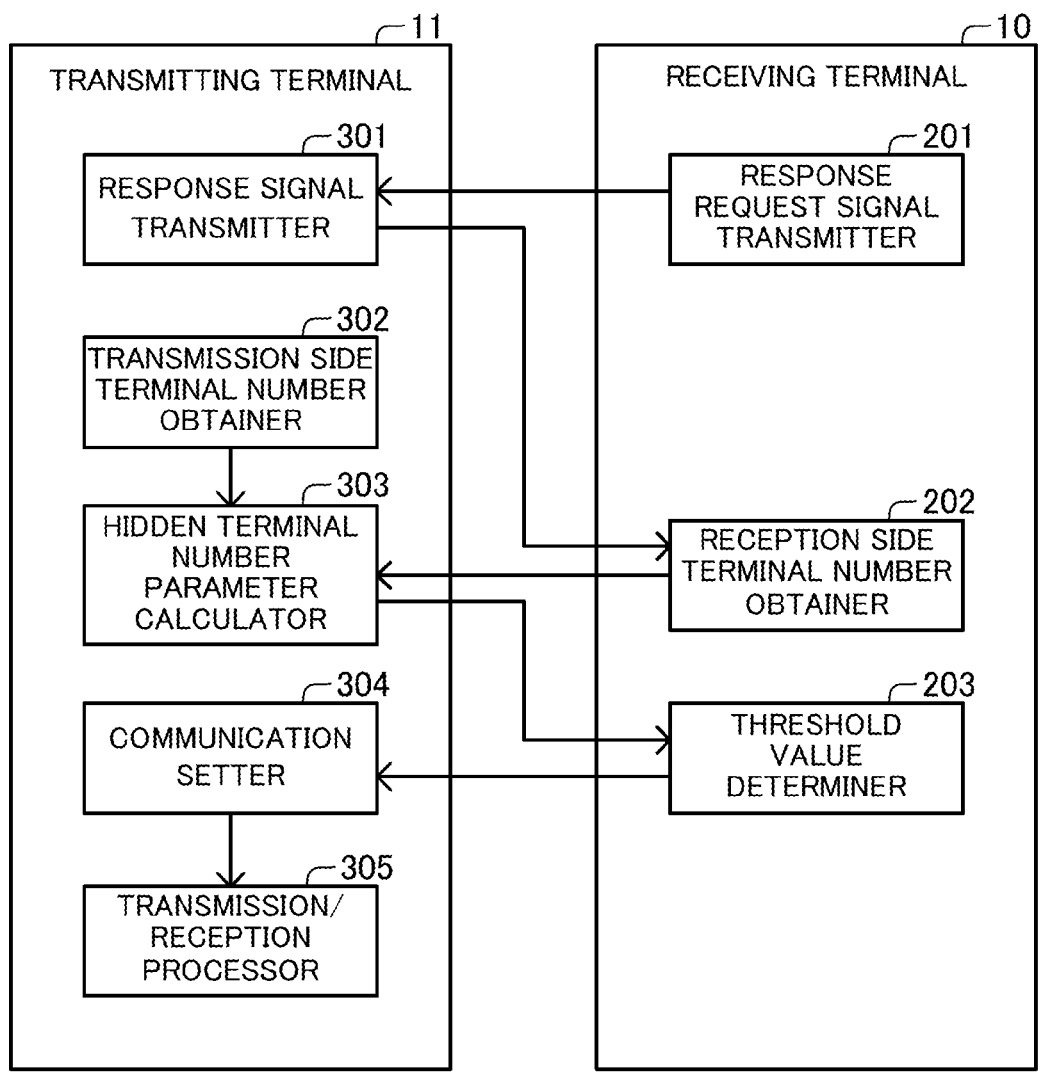
FIG. 3 is a diagram illustrating functions of a transmitting terminal and a receiving terminal according to the first embodiment.

As illustrated in FIG. 3, functions of the receiving terminal 10 include a response request signal transmitter 201, a reception side terminal number obtainer (a reception side terminal number obtainer or transmitter) 202, and a threshold value determiner (notifier) 203.

Further, functions of the transmitting terminal 11 include a response signal transmitter 301, a transmission side terminal number obtainer (a transmission side terminal number obtainer or receiver) 302, a hidden terminal number parameter calculator 303, a communication setter (setting executor) 304, and a transmission/reception processor 305. The hidden terminal number parameter calculator 303, the communication setter 304, and the threshold value determiner 203 constitute an example of a setter. Note that, each of the transmitting terminals 12, 13, ..., and 19 other than the transmitting terminal 11 has a function similar to the function of the transmitting terminal 11.

The response request signal transmitter 201 of the receiving terminal 10 transmits a certain response request signal. In this example, the response request signal is a signal (that is, a broadcast signal) whose destination is set to all wireless terminals. As will be described later, when the response request signal is received, each of the transmitting terminals 11, 12, ..., and 19 does not transfer the response request signal to the other wireless terminals 10, 11, ..., and 19.

The response signal transmitter 301 of the transmitting terminal 11 receives the response request signal transmitted by the receiving terminal 10. When the response request signal is received, the response signal transmitter 301 transmits a certain response signal. In this example, the response signal is also a broadcast signal. As will be described later, when the response signal is received, each of the wireless terminal 10, 11, . . . , and 19 does not transfer the response signal to the other wireless terminals 10, 11, . . . , and 19.

The reception side terminal number obtainer 202 of the receiving terminal 10 receives the response signals transmitted from the transmitting terminals 11, 12, . . . , and 19. The reception side terminal number obtainer 202 obtains a reception side terminal number which is the number of wireless terminal (in this example, the transmitting terminals 11, 12, . . . , and 19) with which the receiving terminal 10 is able to communicate directly. In this example, the reception side terminal number obtainer 202 obtains the reception side terminal number based on the received response signals. For example, the reception side terminal number obtainer 202 obtains the number of response signals received within a period of time until a certain first standby period of time elapses since the response request signal is transmitted as the reception side terminal number.

The reception side terminal number obtainer 202 transmits a reception side terminal number signal representing the obtained reception side terminal number. In this example, the reception side terminal number signal is also a broadcast signal. As will be described later, when the reception side terminal number signal is received, each of the transmitting terminals 11, 12, . . . , and 19 does not transfer the reception side terminal number signal to the other wireless terminals 10, 11, . . . , and 19.

The transmission side terminal number obtainer 302 of the transmitting terminal 11 receives the response signal transmitted from the other transmitting terminals 12, 13, . . . , and 19. When its own terminal 11 is set to execute the direct communication (that is, when its own terminal 11 is a direct transmitting terminal), the transmission side terminal number obtainer 302 obtains a transmission side terminal number which is the number of wireless terminals (in this example, the transmitting terminals 12, 13, . . . , and 19) with which its own terminal (a target transmitting terminal, and here, the transmitting terminal 11) is able to communicate directly. In this example, the transmission side terminal number obtainer 302 obtains the transmission side terminal number based on the received response signals. For example, the transmission side terminal number obtainer 302 obtains the number of response signals received within a period of time until a certain second standby period of time elapses since the response request signal is received as the transmission side terminal number.

The hidden terminal number parameter calculator 303 of the transmitting terminal 11 receives the reception side terminal number signal transmitted from the receiving terminal 10. When its own terminal 11 is the direct transmitting terminal, the hidden terminal number parameter calculator 303 calculates a hidden terminal number parameter based on the reception side terminal number represented by the received reception side terminal number signal and the transmission side terminal number obtained by the transmission side terminal number obtainer 302.

Here, the hidden terminal number parameter has a value that increases as a hidden terminal number increases which is the number of transmitting terminals 12, 13, . . . , and 19 which are unable to communicate directly with its own terminal (the target transmitting terminal, and Here, the transmitting terminal 11) among the transmitting terminals 12, 13, . . . , and 19 which are able to communicate directly with the receiving terminal 10. In this example, the hidden terminal number parameter is a value obtained by subtracting a value obtained by adding "1" to the transmission side terminal number from the reception side terminal number. Note that, the hidden terminal number parameter may be a value obtained by dividing a value obtained by subtracting a value obtained by adding "1" to the transmission side terminal number from the reception side terminal number by the reception side terminal number.

When its own terminal 11 is the direct transmitting terminal, the hidden terminal number parameter calculator 303 transmits a parameter signal representing the calculated hidden terminal number parameter. In this example, the parameter signal is also a broadcast signal. As will be described later, when the parameter signal is received, each of the wireless terminals 10, 11, . . . , and 19 does not transfer the parameter signal to the other wireless terminals 10, 11, . . . , and 19.

The threshold value determiner 203 of the receiving terminal 10 receives the parameter signals transmitted from the transmitting terminals 11, 12, . . . , and 19 (in this example, the direct transmitting terminal). When a maximum value of the hidden terminal number parameters (that is, the hidden terminal number parameters for the direct transmitting terminals) represented by the received parameter signals is equal to or greater than a certain first target value, the threshold value determiner 203 determines a first threshold value. For example, the first target value is an upper limit value of the hidden terminal number allowed to the wireless communication system 1.

The threshold value determiner 203 determines a value equal to or greater than the first target value as the first threshold value. Meanwhile, in this example, as will be described later, the wireless communication system 1 repetitively executes decision of the first threshold value, notification of the first threshold value to the transmitting terminals 11, 12, . . . , and 19, and setting of communication to the transmitting terminals 11, 12, . . . , and 19. The threshold value determiner 203 determines a value which is equal to or greater than the first target value and at least does not increases with an increase in the number of times of repetition as the first threshold value.

For example, when the first threshold value is determined for the first time, the threshold value determiner 203 determines a value which is larger than the first target value by a certain incremental quantity (for example, 5, 10, or 20) as the first threshold value. Then, each time the number of times of repetition increases by a certain amount of change in the number of times (for example, 1, 2, or 5), the threshold value determiner 203 determines a value obtained by subtracting a certain amount of change in threshold value (for example, 1, 2, or 5) from a previous first threshold value as a current first threshold value.

Note that, the threshold value determiner 203 may determine a constant value as the first threshold value. In this case, the threshold value determiner 203 preferably determines the first target value as the first threshold value.

Further, the threshold value determiner 203 may determine the first threshold value based on the hidden terminal number parameter (that is, the hidden terminal number parameters for the direct transmitting terminals) represented by the received parameter signal. For example, the threshold value determiner 203 may determine a maximum value of the hidden terminal number parameters represented by the received parameter signal as the first threshold value.

The threshold value determiner 203 transmits a first threshold value signal representing the determined first threshold value. In this example, the first threshold value signal is also a broadcast signal. As will be described later, when the first threshold value signal is received, each of the transmitting terminals 11, 12, . . . , and 19 does not transfer the first threshold value signal to the other wireless terminals 10, 11, . . . , and 19. Note that, transmission of the first threshold value signal from the receiving terminal 10 to each of the direct transmitting terminals is an example of notification of the first threshold value to each of the direct transmitting terminal.

When its own terminal 11 is the direct transmitting terminal, the communication setter 304 of the transmitting terminal 11 executes a communication selection process, a path setting process, and a transmission power setting process. Note that, execution of the path setting process and the transmission power setting process is an example of communication setting. Meanwhile, the communication setter 304 may be configured not to execute the transmission power setting process.

The communication selection process is a process of selecting either the direct communication, or the indirect communication for its own terminal 11.

In this example, in the communication selection process, the first threshold value signal transmitted from the receiving terminal 10 is received. Further, in the communication selection process, either the direct communication or the indirect communication is selected for its own terminal 11 based on the hidden terminal number parameter calculated by the hidden terminal number parameter calculator 303 and the first threshold value represented by the received first threshold value signal.

For example, in the communication selection process, the indirect communication is selected when the hidden terminal number parameter is equal to or greater than the first threshold value, and the direct communication is selected when the hidden terminal number parameter is smaller than the first threshold value.

As described above, the communication selection process can be referred to as a process of selecting either the direct communication or the indirect communication based on the hidden terminal number parameter which is based on the reception side terminal number and the transmission side terminal number.

The path setting process is a process of setting a path used to transmit physical quantity information from each of the transmitting terminals 11, 12, . . . , and 19 to the receiving terminal 10.

In the path setting process, when the direct communication is selected in the communication selection process, a path (direct path) connecting its own terminal 11 directly with the receiving terminal 10 is set as a path used for its own terminal 11 to transmit the physical quantity information. Meanwhile, in the path setting process, when the indirect communication is selected in the communication selection process, a path (indirect path) connecting its own terminal 11 indirectly with the receiving terminal 10 through at least one other transmitting terminals 12, 13, . . . , and 19 is set as a path used for its own terminal 11 to transmit the physical quantity information.

As described above, the path setting process can be referred to as a process of setting its own terminal 11 to execute the selected communication (that is, the direct communication or the indirect communication).

In this example, in the path setting process, when the indirect path is set, an indirect path setting request including a terminal identifier identifying its own terminal 11 is transmitted. Here, in the path setting process, when there are a plurality of candidates (the transmitting terminals 12, 13, . . . , and 19) as a transmission destination of the indirect path setting request, one of the candidates is selected based on strength (received field strength) of radio signals received from the candidates. Note that, in the path setting process, the transmission destination may be randomly selected from among the candidates.

Further, in the path setting process, when the indirect communication is selected for its own terminal 11 and the indirect path setting requests are received from the other transmitting terminals 12, 13, . . . , and 19, a terminal identifier identifying its own terminal 11 is added to the received indirect path setting request. Then, in the path setting process, the indirect path setting request including the terminal identifier is transmitted.

In the path setting process, when the direct communication is selected for its own terminal 11 and the indirect path setting requests are received from the other transmitting terminals 12, 13, . . . , and 19, a setting completion notification is generated based on information included in the indirect path setting request. In the path setting process, the setting completion notification is transmitted such that the generated setting completion notification is transmitted in a direction opposite to a transmission direction of the indirect path setting request through a path through which the indirect path setting request is transmitted.

The setting completion notification includes path information. The path information is information representing a path through which the indirect path setting request is transmitted. For example, the path information includes a terminal identifier identifying the wireless terminals 10, 11, . . . , and 19 constituting a path and information representing an order in which the wireless terminals 10, 11, . . . , and 19 are lined up in the path.

Further, in the path setting process, when the setting completion notification is received, the path information included in the setting completion notification is held. As described above, the indirect path is set.

Note that, the process of setting the indirect path may be a process according to another method.

The transmission power setting process is a process of setting transmission power (transmission power of a radio signal) used for its own terminal 11 to transmit a signal including the physical quantity information. In the transmission power setting process, when the direct communication is selected in the communication selection process, certain first transmission power is set as the transmission power. In this example, first transmission power is power in which strength (received field strength) of the radio signal received by the receiving terminal 10 is determined to be larger than a certain reference value. Note that, the first transmission power may be power different for each of the transmitting terminals 11, 12, . . . , and 19.

In the transmission power setting process, when the indirect communication is selected in the communication selection process, second transmission power smaller than the first transmission power is set as the transmission power. In this example, the second transmission power is power smaller than the first transmission power by a certain amount of change in power. Thus, the occurrence of a collision of radio signals in the receiving terminal 10 can be more reliably suppressed.

Note that, alternatively, in the transmission power setting process, power in which reception power of a radio signal by the receiving terminal 10 is determined to be smaller than a value which is previously set as a lower limit of a communicable range may be used as the second transmission power. For example, in the transmission power setting process, power in which strength (received field strength) of a radio signal received by the receiving terminal 10 is determined to be smaller than a certain reference value is preferably used as the second transmission power.

The transmission/reception processor 305 of the transmitting terminal 11 executes a transmission process and a transfer process.

The transmission process is a process of transmitting the physical quantity information measured by its own terminal 11 to the receiving terminal 10. The transfer process is a process of transmitting (that is, transferring) the physical quantity information received from the other transmitting terminals 12, 13, . . . , and 19 (that is, excluding its own terminal 11) to the receiving terminal 10.

Note that, in both the transmission process and the transfer process, the transmission/reception processor 305 specifies a transmission destination of the physical quantity information according to a path (that is, a path represented by the held path information) set through the path setting process. Then, the transmission/reception processor 305 transmits the signal including the physical quantity information in which the specified transmission destination is set as the destination with transmission power set through the transmission power setting process.

Meanwhile, the transmission/reception processor 305 may be configured to transmit information including the physical quantity information measured by its own terminal 11 and physical quantity information received from the other transmitting terminals 12, 13, . . . , and 19.

Further, when the response request signal, the response signal, the reception side terminal number signal, the parameter signal, and the first threshold value signal are received, the transmission/reception processor 305 does not transfer the signals.

In this example, the transmission/reception processor 305 executes the transmission process and the transfer process according to the CSMA/CA scheme. In other words, when at least one of the transmission process and the transfer process is executed, the transmission/reception processor 305 executes the carrier sense before transmission of a radio signal.

The carrier sense is a process of detecting whether or not there are radio signals transmitted from the other wireless terminals 10, 11, . . . , and 19 at a frequency (a frequency of a carrier wave) of a radio signal. For example, in the carrier sense, when strength (received field strength) of a radio signal received at a frequency of a radio signal is larger than a certain presence threshold value, it is detected that there are radio signals transmitted from the other wireless terminals 10, 11, . . . , and 19.

When it is detected in the carrier sense that there are radio signals transmitted from the other wireless terminals 10, 11, . . . , and 19, the transmission/reception processor 305 suspends transmission of a radio signal from its own terminal, and then executes the carrier sense again after a certain third standby period of time elapses. When it is detected in the carrier sense that there is no radio signal transmitted from any of the other wireless terminals 10, 11, . . . , and 19, the transmission/reception processor 305 performs transmission of a radio signal from its own terminal.

(Operation)

Next, an operation of the wireless communication system 1 will be described with reference to FIGS. 4 and 5.

In this example, each of the transmitting terminals 11, 12, . . . , and 19 is arranged at the position at which each transmitting terminal can perform wireless communication directly with the receiving terminal 10. In other words, each of the transmitting terminals 11, 12, . . . , and 19 is arranged at the position at which the direct communication can be executed. Note that, the wireless communication system 1 may include another transmitting terminal which is arranged at the position at which the transmitting terminal is not able to perform wireless communication directly with the receiving terminal 10.

Further, in this example, each of the transmitting terminals 11, 12, . . . , and 19 is set to execute the direct communication in the initial status. Thus, in the initial status, each of the transmitting terminals 11, 12, . . . , and 19 sets certain first transmission power as transmission power (transmission power of a radio signal) used for its own terminal to transmit the signal including the physical quantity information.

Figure 4:
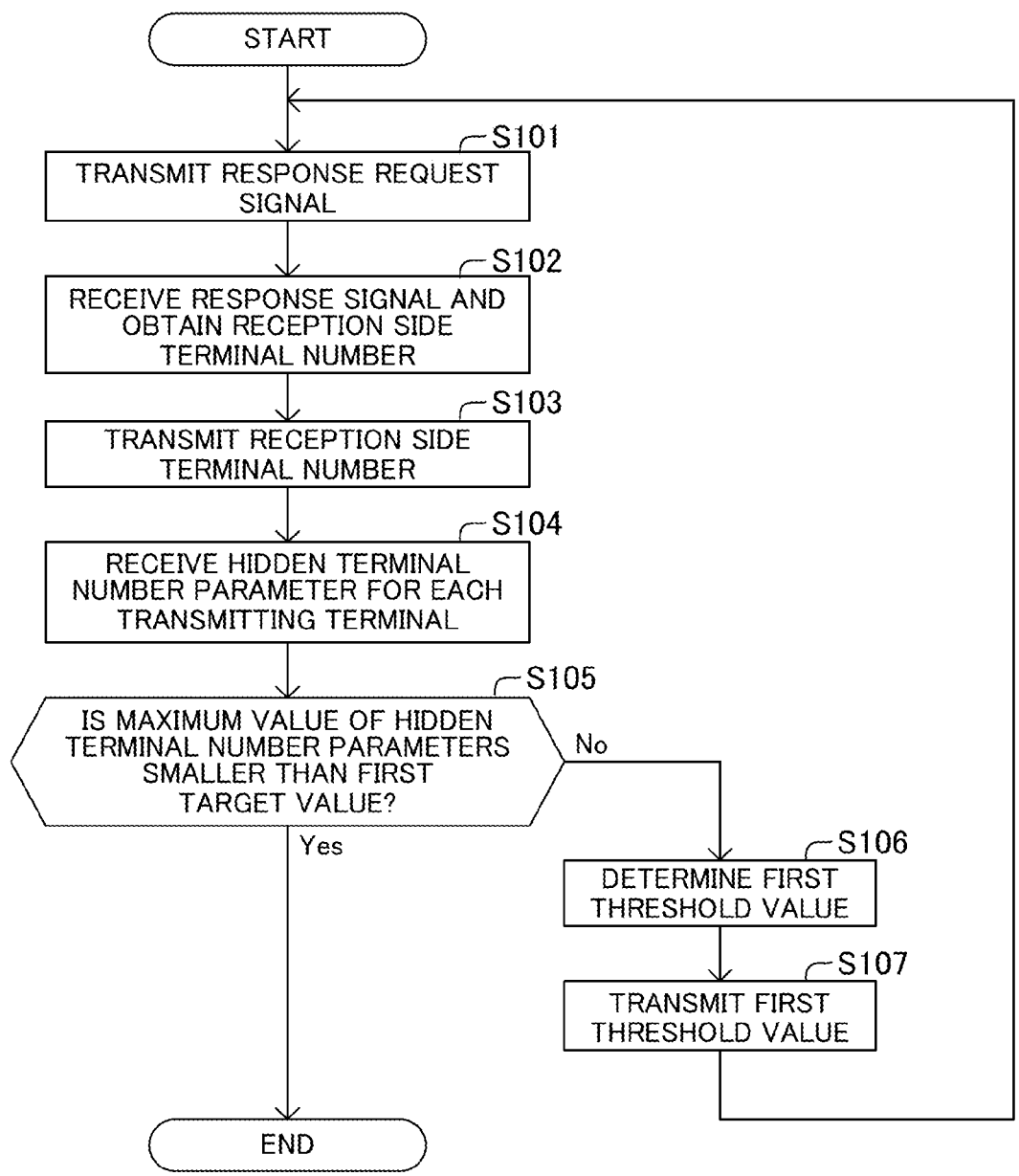
FIG. 4 is a flowchart illustrating a process executed by the receiving terminal according to the first embodiment.

The receiving terminal 10 is configured to execute a process represented by a flowchart of FIG. 4 each time a certain execution period of time elapses. Note that, the receiving terminal 10 may execute this process according to an input of an instruction by the user or reception of an instruction from an information processing apparatus. Further, the receiving terminal 10 may execute this process at a certain timing after the receiving terminal 10 is activated.

Figure 5:
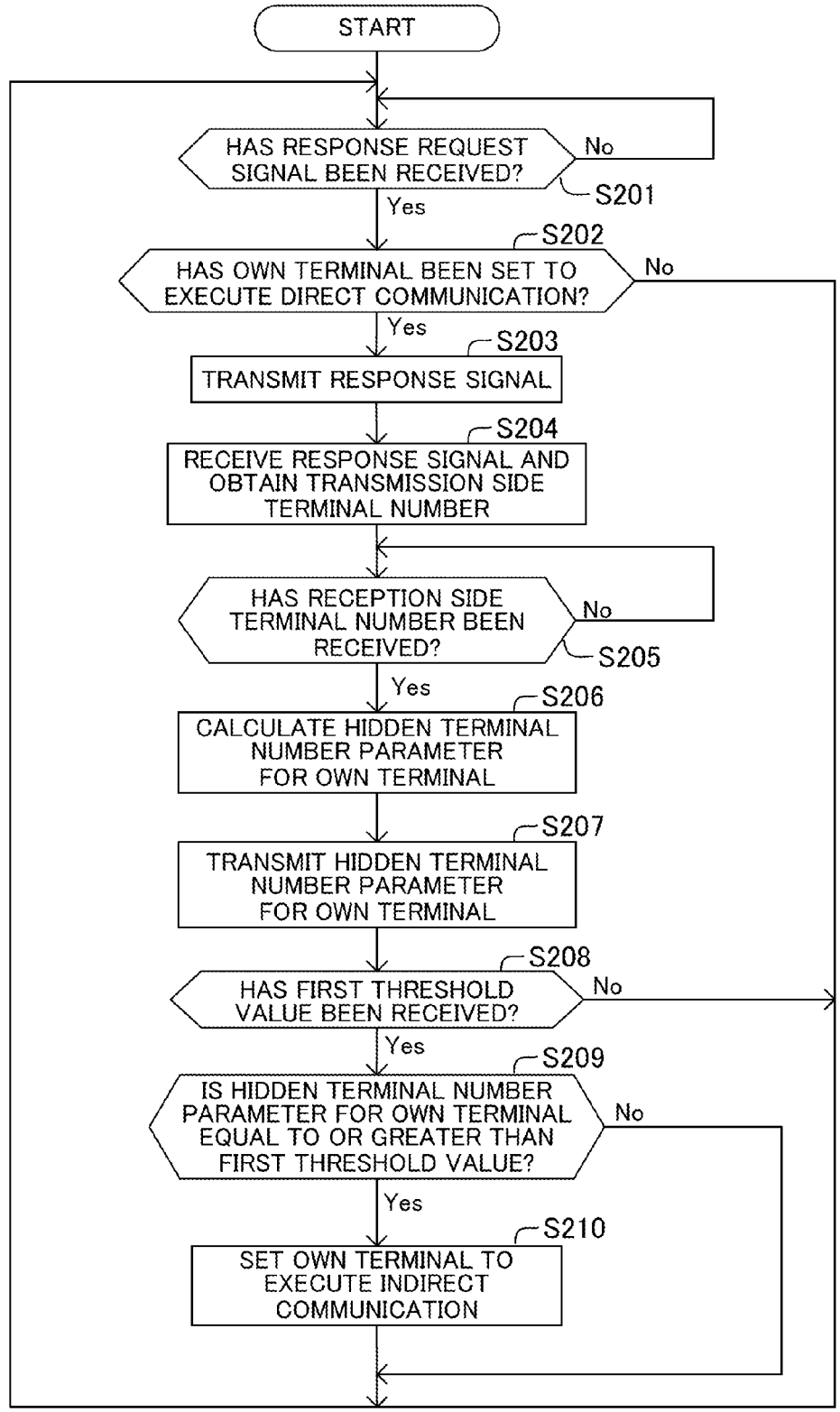
FIG. 5 is a flowchart illustrating a process executed by the transmitting terminal according to the first embodiment.

Meanwhile, the transmitting terminal 11 is configured to execute a process represented by a flowchart of FIG. 5 at a certain timing after the transmitting terminal 11 is activated. Note that, each of the transmitting terminals 12, 13, . . . , and 19 other than the transmitting terminal 11 operates similarly to the transmitting terminal 11. Operations of the transmitting terminals 11, 12, . . . , and 19 will be described below centering on an operation of the transmitting terminal 11.

First of all, the receiving terminal 10 transmits a response request signal (step S101 of FIG. 4).

Meanwhile, the transmitting terminal 11 is on standby until the response request signal is received (step S201 of FIG. 5). Then, when the response request signal is received, the transmitting terminal 11 determines "Yes," and determines whether or not its own terminal 11 has been set to execute the direct communication (step S202 of FIG. 5).

According to the above assumption, at this point in time, the transmitting terminal 11 remains set to execute the direct communication. Thus, the transmitting terminal 11 determines "Yes," and transmits a response signal (step S203 of FIG. 5).

Meanwhile, the receiving terminal 10 obtains the number of the response signals received within a period of time until a certain first standby period of time elapses after the response request signal is transmitted in step S101 of FIG. 4 as the reception side terminal number (step S102 of FIG. 4). According to the above assumption, at this point in time, the receiving terminal 10 obtains "9" as the reception side terminal number. Then, the receiving terminal 10 transmits the reception side terminal number signal representing the obtained reception side terminal number (step S103 of FIG. 4).

Meanwhile, the transmitting terminal 11 obtains the number of the response signals received within a period of time until a certain second standby period of time elapses after the response request signal is received in step S201 of FIG. 5 as the transmission side terminal number (step S204 of FIG. 5). In other words, the transmitting terminal 11 obtains the transmission side terminal number which is the number of transmitting terminals (in this example, the transmitting terminals 12, 13, . . . , and 19) with which its own terminal 11 is able to communicate directly. Here, an example in which the transmitting terminal 11 obtains "2" as the transmission side terminal number is assumed.

Next, the transmitting terminal 11 is on standby until the reception side terminal number signal is received (step S205 of FIG. 5). Then, when the reception side terminal number signal transmitted from the receiving terminal 10 is received, the transmitting terminal 11 determines "Yes," and calculates the hidden terminal number parameter for its own terminal 11 (step S206 of FIG. 5).

In this example, the transmitting terminal 11 calculates a value obtained by subtracting a value obtained by adding '1" to the obtained transmission side terminal number from the reception side terminal number represented by the received reception side terminal number signal as the hidden terminal number parameter. According to the above assumption, the transmitting terminal 11 calculates "6 (=9−2−1)" as the hidden terminal number parameter. Then, the transmitting terminal 11 transmits a parameter signal representing the calculated hidden terminal number parameter (step S207 of FIG. 5).

Meanwhile, the receiving terminal 10 receives the parameter signals transmitted from the transmitting terminals 11, 12, . . . , and 19 (step S104 of FIG. 4). Then, the receiving terminal 10 determines whether or not a maximum value of the hidden terminal number parameters (that is, the hidden terminal number parameters for the direct transmitting terminals 11, 12, . . . , and 19) represented by the received parameter signals is smaller than a certain first target value (step S105 of FIG. 4).

In this example, an example in which the maximum value of the hidden terminal number parameters is "6" and the first target value is "3" is assumed. Thus, the receiving terminal 10 determines "No," and determines the first threshold value (step S106 of FIG. 4). In this example, the receiving terminal 10 determines a value (that is 5) which is larger than the first target value (=3) by a certain incremental quantity (in this example, 2) as a first threshold value at the initial step.

Then, the receiving terminal 10 transmits a first threshold value signal representing the determined first threshold value (step S107 of FIG. 4). Thereafter, the receiving terminal 10 causes the process to return to step S101, and the process of steps S101 to S107 is repetitively executed.

Meanwhile, the transmitting terminal 11 determines whether or not the first threshold value signal transmitted from the receiving terminal 10 has been received within a period of time until a certain fourth standby period of time elapses after the parameter signal is transmitted (step S208 of FIG. 5). According to the above assumption, at this point in time, the transmitting terminal 11 receives the first threshold value signal. Thus, the transmitting terminal 11 determines "Yes," and determines whether or not the hidden terminal number parameter for its own terminal 11 is equal to or greater than the first threshold value represented by the received first threshold value signal (step S209 of FIG. 5).

According to the above assumption, the hidden terminal number parameter for its own terminal 11 is "6," and the first threshold value is "5." Thus, the transmitting terminal 11 determines "Yes," and sets its own terminal 11 to execute the indirect communication (step S210 of FIG. 5).

For example, the transmitting terminal 11 sets a path (an indirect path) connecting its own terminal 11 indirectly with the receiving terminal 10 through at least one of the other transmitting terminals 12, 13, . . . , and 19 as a path used for its own terminal 11 to transmit the physical quantity information.

Further, the transmitting terminal 11 sets second transmission power smaller than the first transmission power by a certain amount of change in power as transmission power (transmission power of a radio signal) used for its own terminal 11 to transmit the signal including the physical quantity information.

Thereafter, the transmitting terminal 11 causes the process to return to step S201, and the process of steps S201 to S210 is repetitively executed.

Then, when the response request signal is received again, the transmitting terminal 11 determines "No" in step S202 of FIG. 5, and causes the process to return to step S201. In other words, the process of steps S203 to S210 of FIG. 5 can be referred to as a process executed only by the transmitting terminal (in other words, the direct transmitting terminal) set to execute the direct communication among the transmitting terminals 11, 12, . . . , and 19.

Note that, when the transmitting terminal 11 proceeds to step S209 of FIG. 5 and the hidden terminal number parameter for its own terminal 11 is smaller than the first threshold value, the transmitting terminal 11 determines "No," and causes the process to return to step S201 without executing the process of step S210. In other words, in this case, the transmitting terminal 11 maintains the state in which its own terminal 11 is set to execute the direct communication.

Meanwhile, the receiving terminal 10 repetitively executes the process of steps S101 to S107 of FIG. 4 until the maximum value of the hidden terminal number parameters for the direct transmitting terminals 11, 12, . . . , and 19 is smaller than the first target value.

At this time, in this example, each time the number of times that the process of step S106 is executed increases by a certain amount of change in the number of times (in this example, "1"), the receiving terminal 10 determines a value obtained by subtracting a certain amount of change in the threshold value (in this example, "1") from the first threshold value determined at the time of previous execution as a current first threshold value. Note that, when the value obtained by subtracting the amount of change in the threshold value from the first threshold value determined at the time of previous execution is equal to or less than the first target value, the receiving terminal 10 determines a value equal to the first target value as the first threshold value.

Thereafter, as the number of transmitting terminals (indirect transmitting terminals) set to execute the indirect communication among the transmitting terminals 11, 12, . . . , and 19 increases, the maximum value of the hidden terminal number parameters for the direct transmitting terminals 11, 12, . . . , and 19 decreases. Then, when the maximum value of the hidden terminal number parameters for the direct transmitting terminals 11, 12, . . . , and 19 is smaller than the first target value, the receiving terminal 10 determines "Yes" when the process proceeds to step S105 of FIG. 4, and then the process illustrated in FIG. 4 ends.

As described above, the wireless communication system 1 according to the first embodiment obtains the reception side terminal number which is the number of the transmitting terminals 11, 12, . . . , and 19 with which the receiving terminal 10 is able to communicate directly. Further, the wireless communication system 1 obtains the transmission side terminal number which is the number of the other transmitting terminals 11, 12, . . . , and 19 with which each of the transmitting terminals 11, 12, . . . , and 19 is able to communicate directly. In addition, the wireless communication system 1 selects either the direct communication or the indirect communication based on the reception side terminal number and the transmission side terminal number for each of the transmitting terminals 11, 12, . . . , and 19. Further, the wireless communication system 1 sets the transmitting terminal to execute communication selected for each of the transmitting terminals 11, 12, . . . , and 19.

Meanwhile, the reception side terminal number and the transmission side terminal number exactly reflect the hidden terminal number. Thus, according to the above configuration, the occurrence of a collision of radio signals in the receiving terminal 10 can be suppressed. Further, the amount of information including the reception side terminal number and the transmission side terminal number is smaller than a sum total of the amounts of wireless terminals in which the wireless terminals 10, 11, . . . , and 19 are able to communicate with its own terminal.

Thus, a load (for example, a processing load needed to select either the direct communication or the indirect communication and a communication load needed to communicate the information) can be reduced. As described above, according to the above configuration, the communication efficiency can be increased while avoiding an excessive increase in a load.

Further, the wireless communication system 1 according to the first embodiment calculates the hidden terminal number parameter that increases as the hidden terminal number increases for each of the transmitting terminals 11, 12, . . . , and 19 based on the reception side terminal number and the transmission side terminal number. Furthermore, the wireless communication system 1 selects the indirect communication for the transmitting terminals 11, 12, . . . , and 19 in which the hidden terminal number parameter is equal to or greater than the certain first threshold value.

Thus, when the hidden terminal number is relatively large, the transmitting terminals 11, 12, . . . , and 19 execute the indirect communication. Accordingly, the occurrence of a collision of radio signals in the receiving terminal 10 can be suppressed.

In addition, the wireless communication system 1 according to the first embodiment repetitively executes the decision of the first threshold value, the notification of the first threshold value to the transmitting terminals 11, 12, . . . , and 19, and the communication setting for the transmitting terminals 11, 12, . . . , and 19. Further, the wireless communication system 1 determines a value which is equal to or greater than the first target value but at least does not increase with an increase in the number of times of repetition as the first threshold value.

Thus, it is possible to cause the maximum value of the hidden terminal number parameters for the direct transmitting terminals 11, 12, . . . , and 19 to be smaller than the first target value while preventing the number of the transmitting terminals 11, 12, . . . , and 19 executing the indirect communication from wastefully increasing.

Note that, in the wireless communication system 1, each of the transmitting terminals 11, 12, . . . , and 19 may transmit information representing communication (the direct communication or the indirect communication) set to be executed by its own terminal and notify a neighboring wireless terminal of the information.

Further, the wireless communication system 1 according to the first embodiment is configured such that all of the transmitting terminals 11, 12, . . . , and 19 set to execute the direct communication perform communication selection based on the hidden terminal number parameter. However, the wireless communication system 1 may be configured such that some of the transmitting terminals 11, 12, . . . , and 19 set to execute the direct communication perform communication selection. For example, the wireless communication system 1 may be configured such that one of the transmitting terminals 11, 12, . . . , and 19 set to execute the direct communication is specified as the target transmitting terminal, and only the specified target transmitting terminal performs the communication selection.

Note that, in the wireless communication system 1, each of the wireless terminals 10, 11, . . . , and 19 may not include the sensor 109. For example, each of the wireless terminal 10, 11, . . . , 19 may be configured to be connected to a device including a sensor and receive the physical quantity information from the device.

Note that, the wireless communication system 1 may use a value obtained by adding the number (that is, "1") of the receiving terminals 10 to the number of the response signals received by the transmitting terminal as the transmission side terminal number. In this case, the wireless communication system 1 preferably calculates a value obtained by subtracting the transmission side terminal number from the reception side terminal number as the hidden terminal number parameter.

Further, the wireless communication system 1 may be configured such that a path is set according to a known method, and then the set path is changed by selecting communication for the direct transmitting terminals 11, 12, . . . , and 19. In this case, the wireless communication system 1 preferably obtains the reception side terminal number based on the path information representing the set path instead of obtaining the reception side terminal number based on the response signal to the response request signal.

<The Second Embodiment>

Next, a wireless communication system according to a second embodiment of the present invention will be described. The wireless communication system according to the second embodiment is different from the wireless communication system according to the first embodiment in that a receiving terminal is configured to select a transmitting terminal changing a setting of communication. The following description will proceed focusing on the different point. Note that, in the description of the second embodiment, components denoted by the same reference numerals as in the first embodiment are the same components or approximately the same component as in the first embodiment.

(Function)

Figure 6:
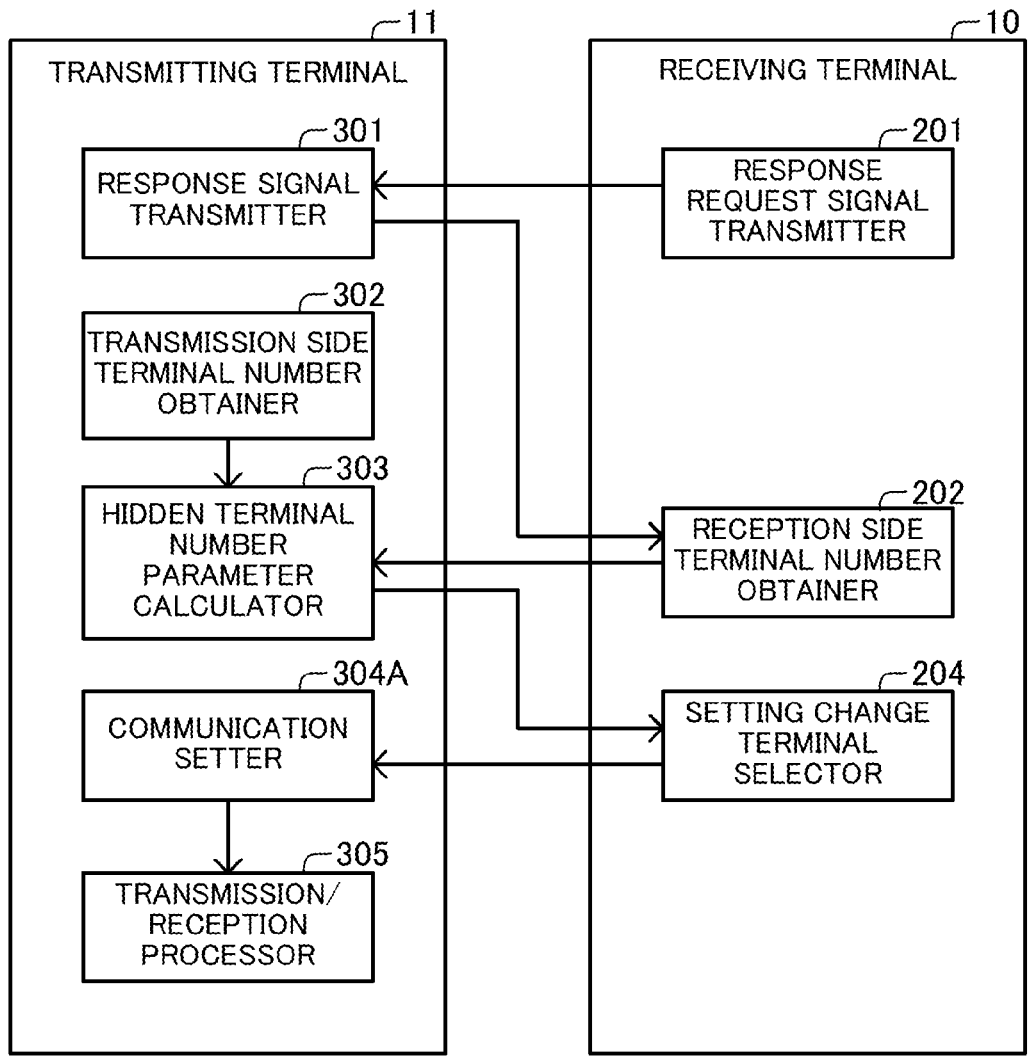
FIG. 6 is a diagram illustrating functions of a transmitting terminal and a receiving terminal according to a second embodiment.

As illustrated in FIG. 6, as a function of the receiving terminal 10 according to the second embodiment, a setting change terminal selector (a part of a notifier or setter) 204 is provided instead of the threshold value determiner 203. Further, as a function of the transmitting terminal 11 according to the second embodiment, a communication setter 304A is provided instead of the communication setter 304.

The setting change terminal selector 204 receives parameter signals transmitted from the transmitting terminals 11, 12, . . . , and 19 (in this example, the direct transmitting terminals) The setting change terminal selector 204 selects a setting change terminal based on the hidden terminal number parameter when the maximum value of the hidden terminal number parameters (that is, the hidden terminal number parameters for the direct transmitting terminals) represented by the received parameter signals is equal to or greater than a certain first target value. The setting change terminal is the transmitting terminals 11, 12, . . . , and 19 executing the indirect communication.

In this example, the setting change terminal selector 204 selects a transmitting terminal including the largest hidden terminal number parameter as the setting change terminal. Note that, the setting change terminal selector 204 may select a plurality of the transmitting terminals as the setting change terminal. In this case, the setting change terminal selector 204 preferably selects a transmitting terminal that is large in the hidden terminal number parameter more preferentially than a transmitting terminal that is small in the hidden terminal number parameter as the setting change terminal.

The setting change terminal selector 204 transmits a terminal identifier signal representing a terminal identifier identifying the selected setting change terminal. In this example, the terminal identifier signal is a broadcast signal. Note that, when the terminal identifier signal is received, each of the transmitting terminals 11, 12, . . . , and 19 does not transfer the terminal identifier signal to the other wireless terminals 10, 11, . . . , and 19. Note that, transmission of the terminal identifier signal from the receiving terminal 10 to each direct transmitting terminal is an example of notification of a terminal identifier to each direct transmitting terminal.

Further, the communication setter 304A according to the second embodiment executes the communication selection process, the path setting process, and the transmission power setting process when its own terminal 11 is the direct transmitting terminal, similarly to the communication setter 304 according to the first embodiment.

In the communication selection process according to the second embodiment, selection of communication is performed based on the terminal identifier rather than the first threshold value.

For example, the communication setter 304A receives the terminal identifier signal transmitted from the receiving terminal 10. Then, the communication setter 304A selects either the direct communication, or the indirect communication for its own terminal 11 based on whether or not the terminal identifier represented by the received terminal identifier signal matches a terminal identifier identifying its own terminal 11 (in other words, a wireless terminal identified by the received terminal identifier is its own terminal 11).

In other words, the communication setter 304A selects the indirect communication when the wireless terminal identified by the terminal identifier represented by the received terminal identifier signal is its own terminal 11 but selects the direct communication when the identified wireless terminal is not its own terminal 11.

(Operation)

Next, an operation of the wireless communication system 1 will be described with reference to FIGS. 7 and 8.

Figure 7:
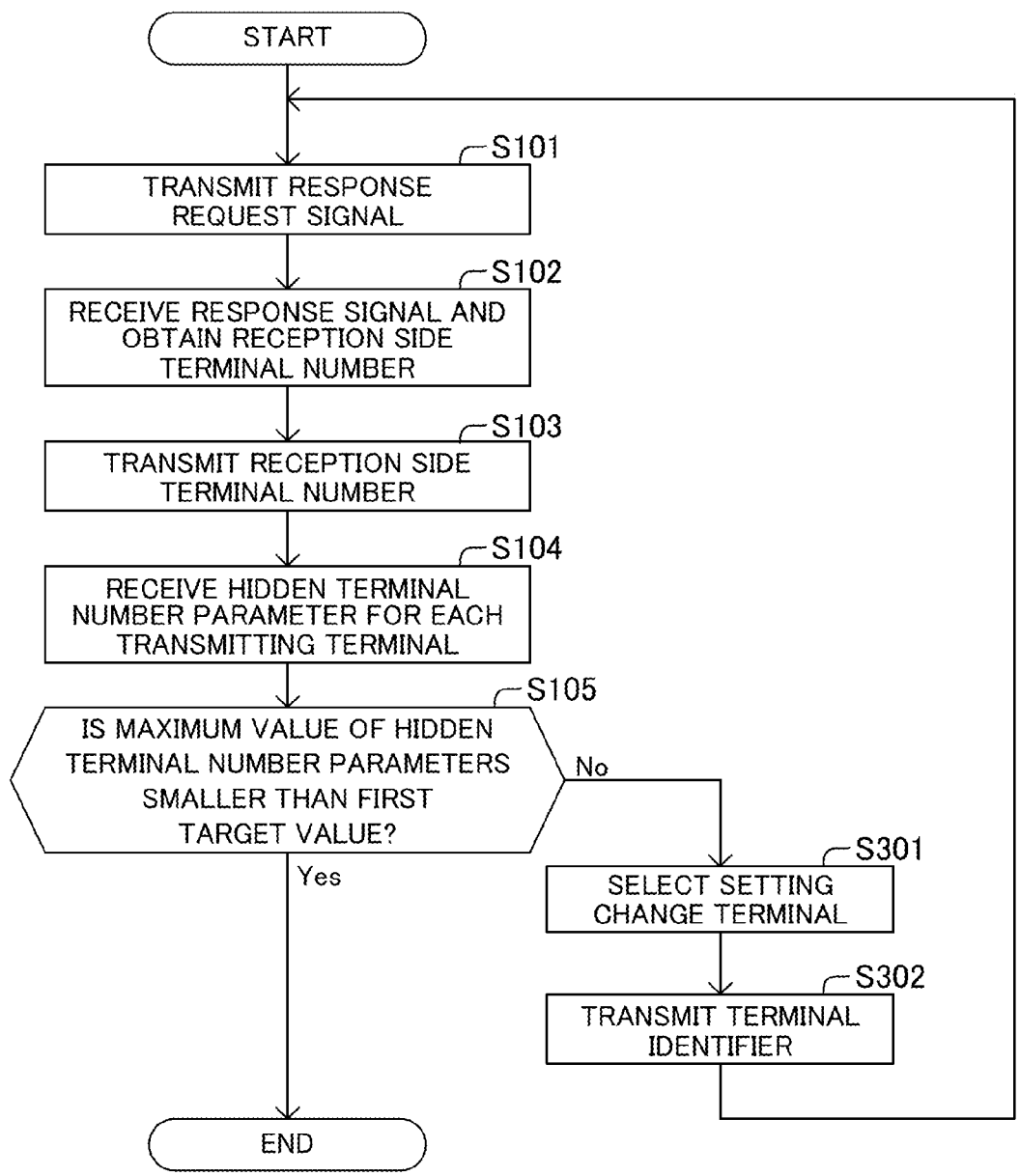
FIG. 7 is a flowchart illustrating a process executed by the receiving terminal according to the second embodiment.

The receiving terminal 10 is configured to execute a process such that the process of steps S106 and S107 in the flowchart of FIG. 4 according to the first embodiment is replaced with a process of steps S301 to S302 illustrated in FIG. 7.

Figure 8:
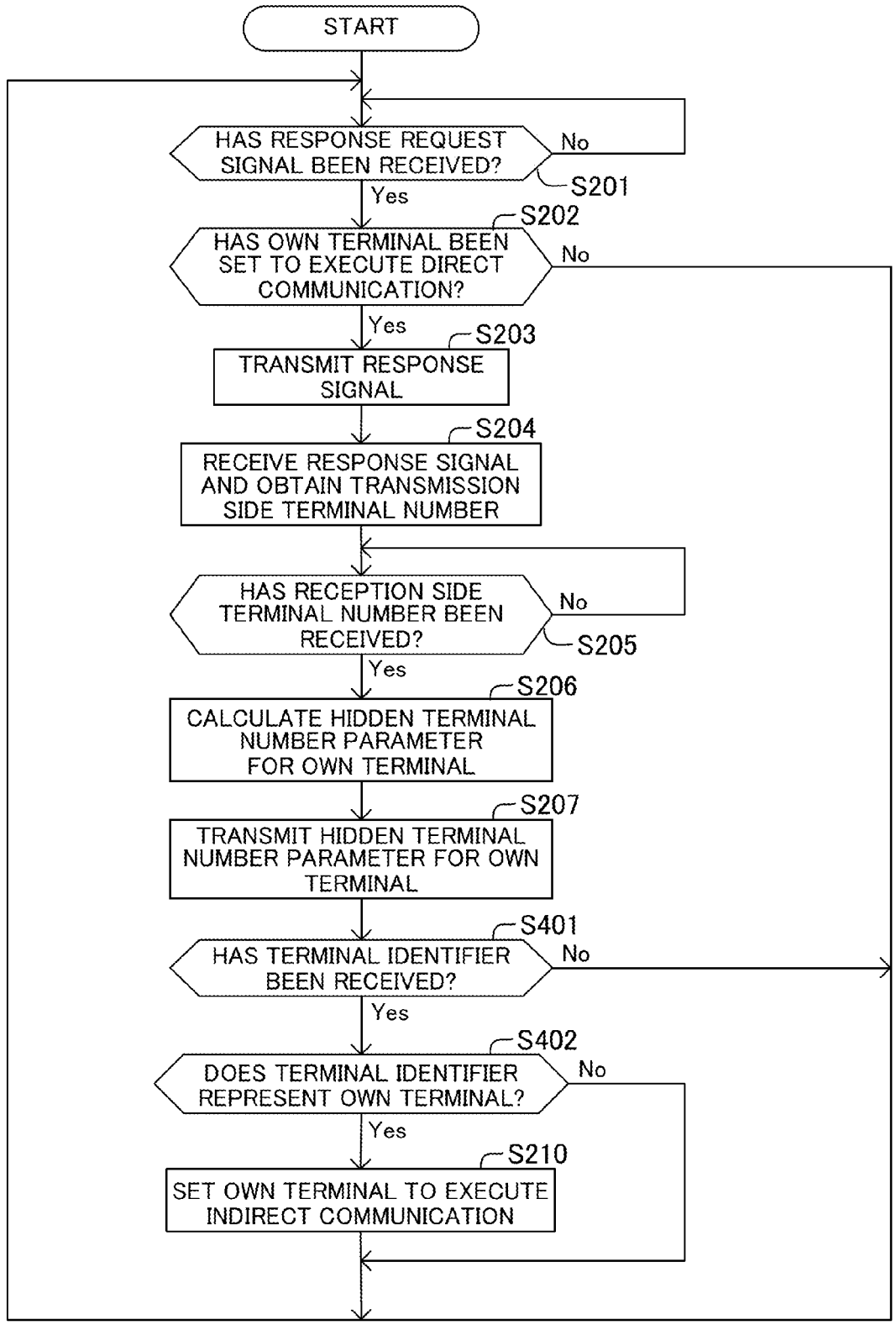
FIG. 8 is a flowchart illustrating a process executed by the transmitting terminal according to the second embodiment.

Further, the transmitting terminal 11 configured to execute a process such that the process of steps S208 and S209 in the flowchart of FIG. 5 according to the first embodiment is replaced with a process of steps S401 to S402 illustrated in FIG. 8.

For example, when "No" is determined in step S105 of FIG. 7, the receiving terminal 10 selects the setting change terminal from among the transmitting terminals 11, 12, . . . , and 19 that have transmitted the parameter signal (step S301 of FIG. 7). In this example, the receiving terminal 10 selects the transmitting terminals 11, 12, . . . , or 19 that is largest in the hidden terminal number parameter (that has transmitted the parameter signal representing the largest hidden terminal number parameter) as the setting change terminal.

Then, the receiving terminal 10 transmits a terminal identifier signal representing a terminal identifier identifying the selected setting change terminal (step S302 of FIG. 7). Thereafter, the receiving terminal 10 causes the process to return to step S101.

Meanwhile, after transmitting the parameter signal in step S207 of FIG. 8, the transmitting terminal 11 determines whether or not the terminal identifier signal transmitted from the receiving terminal 10 has been received within a period of time until a certain fourth standby period of time elapses after the parameter signal is transmitted (step S401 of FIG. 8). According to the above assumption, at this point in time, the transmitting terminal 11 receives the terminal identifier signal.

Thus, the transmitting terminal 11 determines "Yes," and determines whether or not the wireless terminal identified by the received terminal identifier is its own terminal 11 (step S402 of FIG. 8).

Then, when the wireless terminal identified by the received terminal identifier is its own terminal 11, the transmitting terminal 11 determines "Yes," and sets its own terminal 11 to execute the indirect communication (step S210 of FIG. 8).

However, when the wireless terminal identified by the received terminal identifier is not its own terminal 11, the transmitting terminal 11 determines "No," and causes the process to return to step S201 without executing the process of step S210. In other words, in this case, the transmitting terminal 11 maintains the state in which its own terminal 11 is set to execute the direct communication.

As described above, the wireless communication system 1 according to the second embodiment can include the same effects as the wireless communication system 1 according to the first embodiment.

<Third Embodiment>

Next, a wireless communication system according to a third embodiment of the present invention will be described. The wireless communication system according to the third embodiment is different from the wireless communication system according to the first embodiment in that a transmitting terminal set to execute the indirect communication is reset to execute the direct communication when a certain condition is satisfied. The following description will proceed focusing on the different point. Note that, in the description of the third embodiment, components denoted by the same reference numerals as in the first embodiment are the same components or approximately the same component as in the first embodiment.

(Function)

Figure 9:
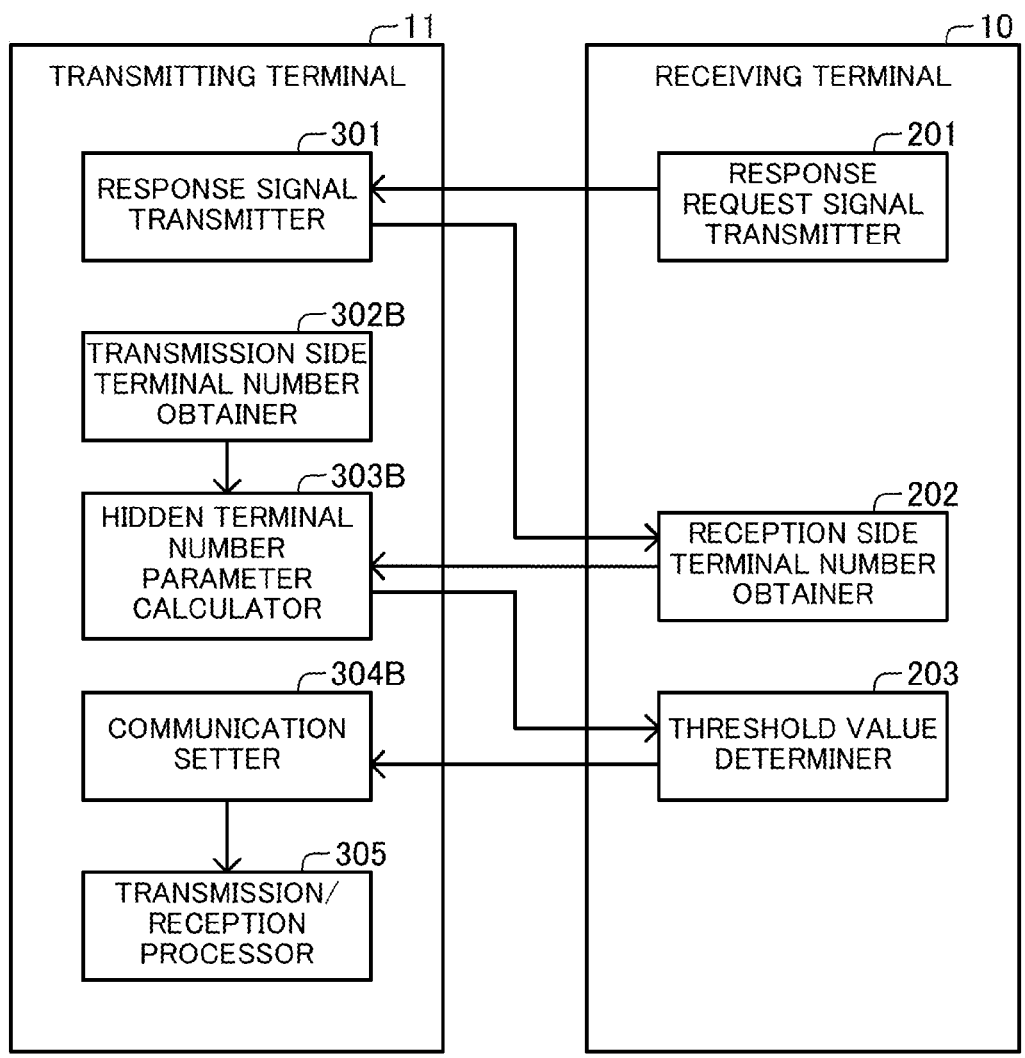
FIG. 9 is a diagram illustrating functions of a transmitting terminal and a receiving terminal according to a third embodiment.

As illustrated in FIG. 9, as a function of the transmitting terminal 11 according to the third embodiment, a transmission side terminal number obtainer 302B is provided instead of the transmission side terminal number obtainer 302. Further, as a function of the transmitting terminal 11, a hidden terminal number parameter calculator 303B is provided instead of the hidden terminal number parameter calculator 303. Further, as a function of the transmitting terminal 11, a communication setter 304B is provided instead of the communication setter 304.

The transmission side terminal number obtainer 302B obtains the transmission side terminal number even when its own terminal 11 is the indirect transmitting terminal in addition to the function of the transmission side terminal number obtainer 302. The indirect transmitting terminal is a transmitting terminal set to execute the indirect communication.

Similarly, the hidden terminal number parameter calculator 303B calculates the hidden terminal number parameter even when its own terminal 11 is the indirect transmitting terminal in addition to the function of the hidden terminal number parameter calculator 303.

Further, the communication setter 304B according to the third embodiment executes a return process when its own terminal 11 is the indirect transmitting terminal in addition to the function of the communication setter 304.

The return process is a process of setting its own terminal 11 to execute the direct communication when the hidden terminal number parameter for its own terminal 11 is a smaller than a certain second threshold value.

(Operation)

Next, an operation of the wireless communication system 1 will be described with reference to FIG. 10.

The receiving terminal 10 is configured to execute the same process as the process illustrated in FIG. 4 according to the first embodiment.

Figure 10:
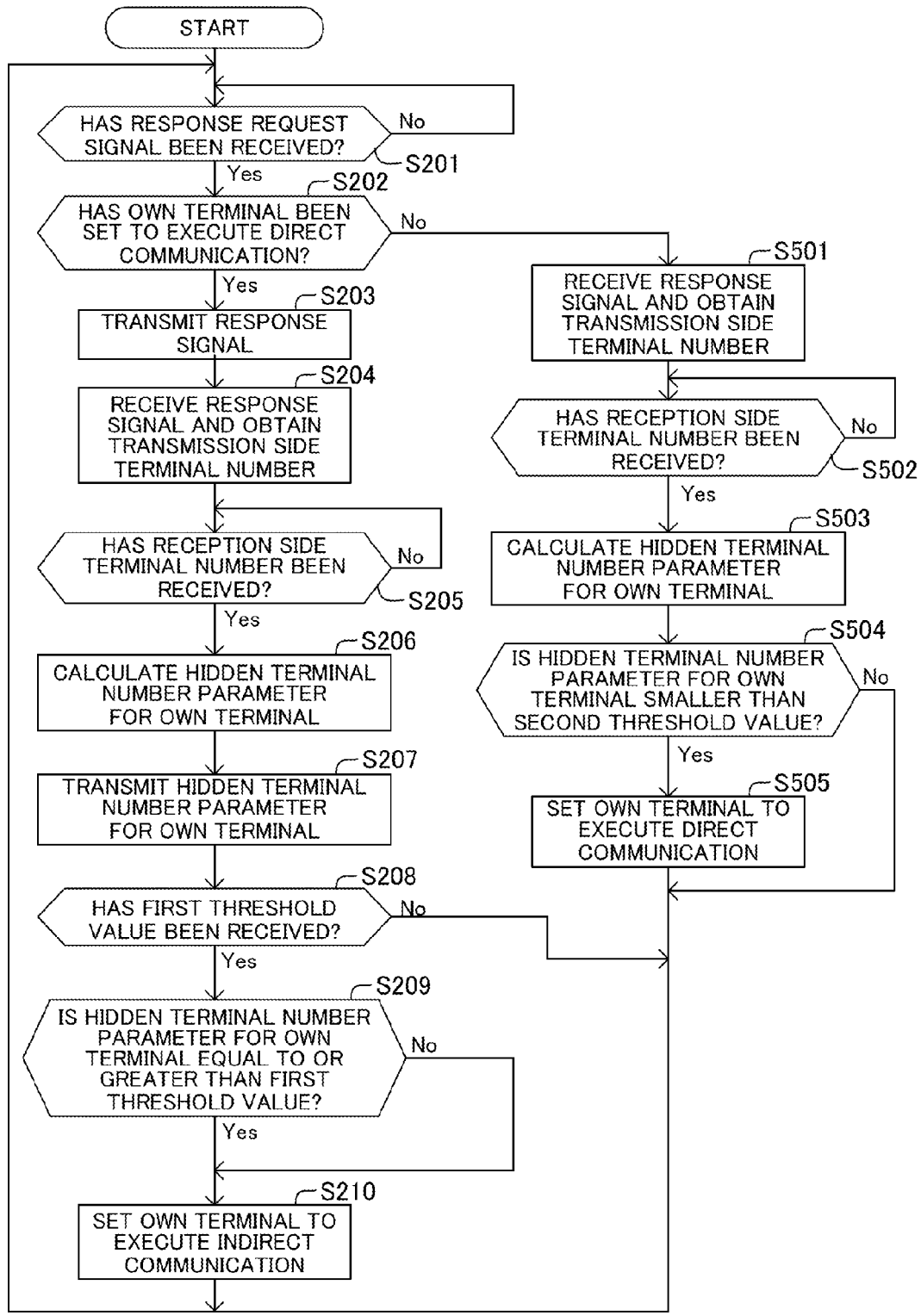
FIG. 10 is a flowchart illustrating a process executed by the transmitting terminal according to the third embodiment.

Further, the transmitting terminal 11 is configured to execute a process in which the process of steps S501 to S505 as illustrated in FIG. 10 is added after "No" is determined in step S202 in the process illustrated in FIG. 5 according to the first embodiment.

For example, when "No" is determined in step S202 of FIG. 10, the transmitting terminal 11 obtains the number of response signals received within a period of time until a certain fifth standby period of time elapses after the response request signal is received in step S201 of FIG. 10 as the transmission side terminal number (step S501 of FIG. 10). In other words, the transmitting terminal 11 obtains the transmission side terminal number which is the number of transmitting terminals (in this example, the transmitting terminals 12, 13, . . . , and 19) with which its own terminal 11 is able to communicate directly.

Next, the transmitting terminal 11 is on standby until the reception side terminal number signal is received (step S502 of FIG. 10). Then, when the reception side terminal number signal transmitted from the receiving terminal 10 is received, the transmitting terminal 11 determines "Yes," and calculates the hidden terminal number parameter for its own terminal 11 (step S503 of FIG. 10).

Then, the transmitting terminal 11 determines whether or not the hidden terminal number parameter for its own terminal 11 is smaller than a certain second threshold value (step S504 of FIG. 10). In this example, the second threshold value is set to "1." Note that, the second threshold value is preferably a value equal to or less than the first threshold value. Further, the second threshold value may be a value which is determined by the receiving terminal 10 and then transmitted from the receiving terminal 10.

Then, when the hidden terminal number parameter is smaller than the second threshold value, the transmitting terminal 11 determines "Yes," and sets its own terminal 11 to execute the direct communication (step S505 of FIG. 10).

However, when the hidden terminal number parameter is equal to or greater than the second threshold value, the transmitting terminal 11 determines "No," and causes the process to return to step S201 without performing the process of step S505. In other words, in this case, the transmitting terminal 11 maintains the state in which its own terminal 11 is set to execute the indirect communication.

As described above, the wireless communication system 1 according to the third embodiment can include the same effects as the wireless communication system 1 according to the first embodiment.

Further, the wireless communication system 1 according to the third embodiment calculates the hidden terminal number parameter for each of the indirect transmitting terminals 11, 12, . . . , and 19. Further, the wireless communication system 1 resets the indirect transmitting terminal in which the hidden terminal number parameter is smaller than the second threshold value to execute the direct communication.

Meanwhile, when the hidden terminal number parameters for the indirect transmitting terminals 11, 12, . . . , and 19 are sufficiently small, a possibility that the hidden terminal numbers for the transmitting terminals 11, 12, . . . , and 19 will increase is sufficiently low even when the indirect transmitting terminal executes the direct communication. Thus, according to the above configuration, it is possible to prevent the number of the transmitting terminals 11, 12, . . . , and 19 executing the indirect communication from wastefully increasing while suppressing the occurrence of a collision of radio signals in the receiving terminal 10.

<Fourth Embodiment>

Next, a wireless communication system according to a fourth embodiment of the present invention will be described. The wireless communication system according to the fourth embodiment is different from the wireless communication system according to the first embodiment in that a transmitting terminal set to execute the indirect communication is reset to execute the direct communication when a certain condition is satisfied. The following description will proceed focusing on the different point. Note that, in the description of the fourth embodiment, components denoted by the same reference numerals as in the first embodiment are the same components or approximately the same component as in the first embodiment.

(Function)

Figure 11:
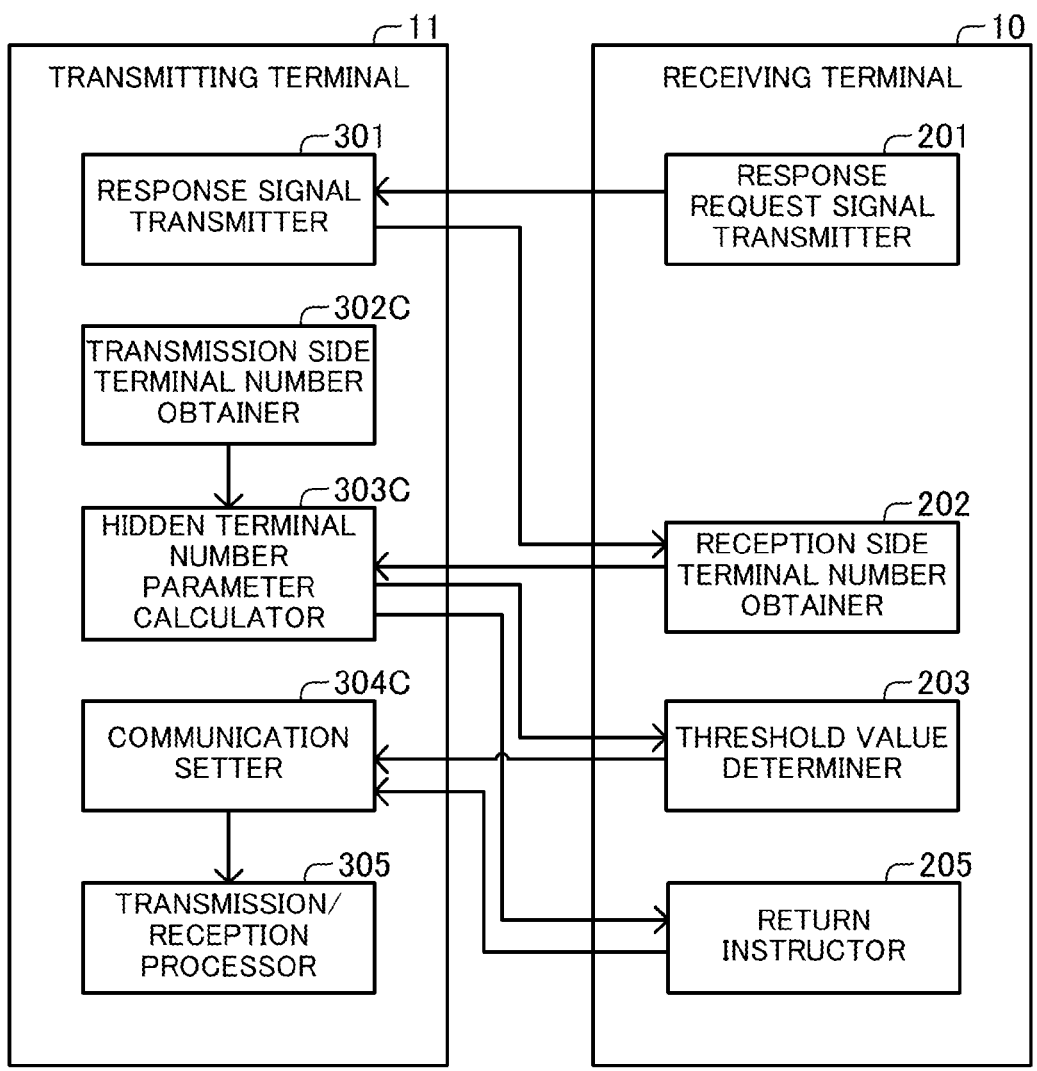
FIG. 11 is a diagram illustrating functions of a transmitting terminal and a receiving terminal according to the fourth embodiment.

As illustrated in FIG. 11, as a function of the receiving terminal 10 according to the fourth embodiment, a return instructor (a part of a setter) 205 is provided in addition to the functions of the receiving terminal 10 according to the first embodiment.

The return instructor 205 transmits a certain return notification signal when the maximum value of the hidden terminal number parameters (that is, the hidden terminal number parameters for the direct transmitting terminal) represented by the parameter signals transmitted from the direct transmitting terminals 11, 12, . . . , and 19 is smaller than a certain second target value. The second target value is a value smaller than the first target value. In this example, the second target value is a value obtained by subtracting a certain reserved amount from the first target value.

In this example, the return notification signal is a signal (that is, a broadcast signal) in which all wireless terminals are set as the destination. When the return notification signal is received, each of the transmitting terminals 11, 12, . . . , and 19 does not transfer the return notification signal to the other wireless terminals 10, 11, . . . , and 19.

Further, the return instructor 205 receives the hidden terminal number parameters represented by the parameter signals transmitted from the indirect transmitting terminals 11, 12, . . . , and 19. Note that, the indirect transmitting terminal is a transmitting terminal set to execute the indirect communication.

Then, the return instructor 205 selects the setting change terminal based on the hidden terminal number parameters (that is, the hidden terminal number parameters for the indirect transmitting terminals) represented by the received parameter signals. The setting change terminal is the transmitting terminals 11, 12, . . . , or 19 executing the direct communication.

In this example, the return instructor 205 selects a transmitting terminal including the smallest hidden terminal number parameter as the setting change terminal. Note that, the return instructor 205 may select a plurality of the transmitting terminals as the setting change terminal. In this case, the return instructor 205 preferably selects a transmitting terminal that is small in the hidden terminal number parameter more preferentially than a transmitting terminal that is large in the hidden terminal number parameter as the setting change terminal.

Then, the return instructor 205 transmits a certain return instruction signal to each of the selected setting change terminal. In this example, the return instruction signal is a signal in which the setting change terminal is set as the destination.

Further, as a function of the transmitting terminal 11 according to the fourth embodiment, a transmission side terminal number obtainer 302C is provided instead of the transmission side terminal number obtainer 302. Further, as a function of the transmitting terminal 11, a hidden terminal number parameter calculator 303C is provided instead of the hidden terminal number parameter calculator 303. In addition, as a function of the transmitting terminal 11, a communication setter 304C is provided instead of the communication setter 304.

The transmission side terminal number obtainer 302C obtains the transmission side terminal number even when its own terminal 11 is the indirect transmitting terminal in addition to the function of the transmission side terminal number obtainer 302.

Similarly, the hidden terminal number parameter calculator 303C calculates the hidden terminal number parameter even when its own terminal 11 is the indirect transmitting terminal in addition to the function of the hidden terminal number parameter calculator 303. Further, the hidden terminal number parameter calculator 303C transmits the parameter signal representing the calculated hidden terminal number parameter when the return notification signal transmitted from the receiving terminal 10 is received.

Further, the communication setter 304C executes the return process when its own terminal 11 is the indirect transmitting terminal in addition to the function of the communication setter 304.

The return process is a process of setting its own terminal 11 to execute the direct communication when the return instruction signal in which its own terminal 11 is set as the destination is received.

(Operation)

Next, an operation of the wireless communication system 1 will be described with reference to FIGS. 12 and 13.

Figure 12:
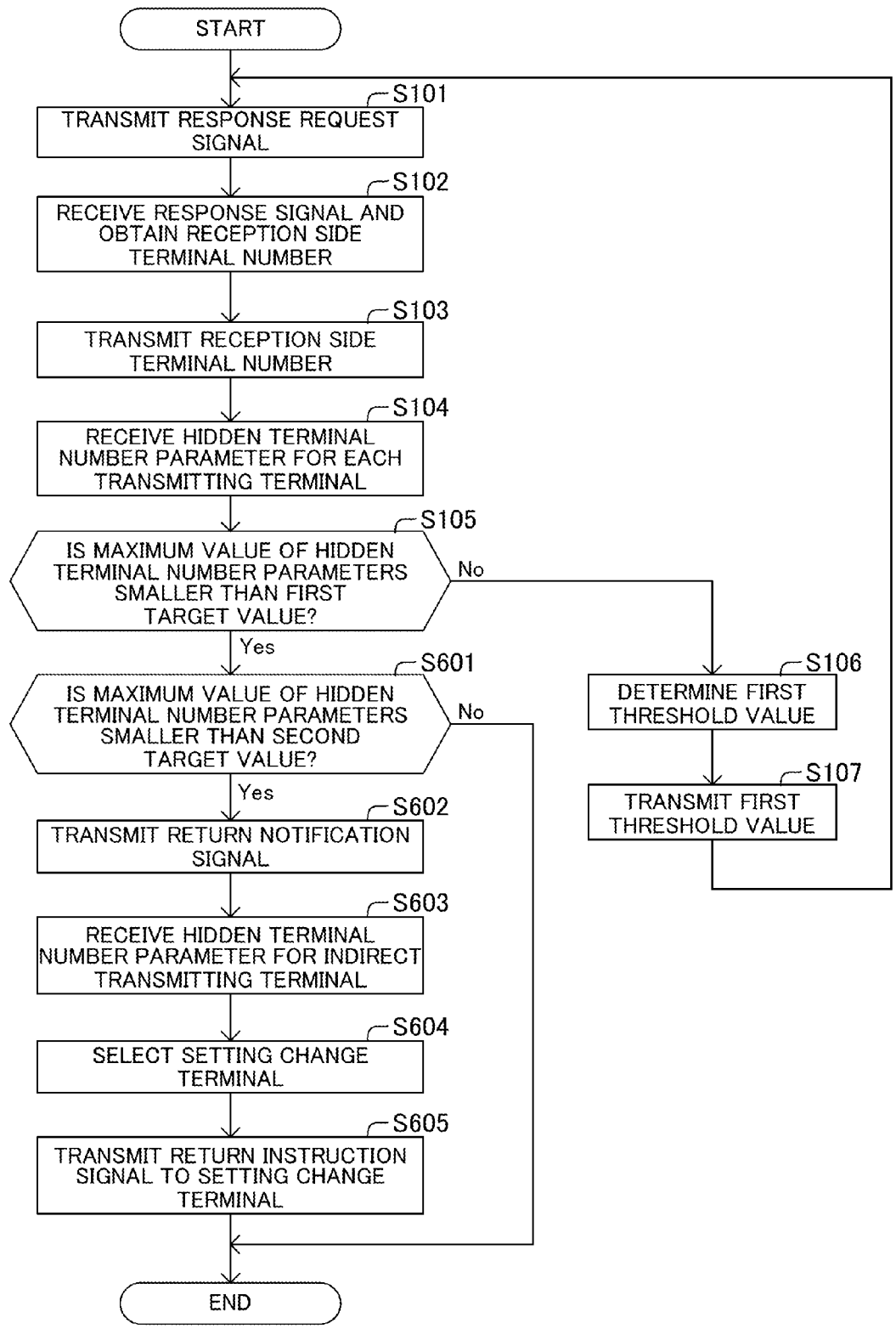
FIG. 12 is a flowchart illustrating a process executed by the receiving terminal according to the fourth embodiment.

The receiving terminal 10 is configured to execute a process in which the process of steps S601 to S605 as illustrated in FIG. 12 is added after "Yes" is determined in step S105 in the process of FIG. 4 according to the first embodiment.

Further, the transmitting terminal 11 is configured to execute a process in which the process of steps S701 to S707 as illustrated in FIG. 13 is added before step S201 after "No" is determined in step S202 in the process of FIG. 5 according to the first embodiment.

For example, when "Yes" is determined in step S105 of FIG. 12, the receiving terminal 10 determines whether or not the maximum value of the hidden terminal number parameters represented by the parameter signals received in step S104 is smaller than a certain second target value (step S601 of FIG. 12). Note that, the hidden terminal number parameters are the hidden terminal number parameters for the direct transmitting terminals 11, 12, . . . , and 19.

Here, an example in which the maximum value of the hidden terminal number parameters is smaller than the second target value is assumed. In this case, the receiving terminal 10 determines "Yes," and transmits the return notification signal (step S602 of FIG. 12).

However, when "No" is determined in step S202 of FIG. 13, the transmitting terminal 11 obtains the number of response signals received within a period of time until a certain fifth standby period of time elapses after the response request signal is received in step S201 of FIG. 5 as the transmission side terminal number (step S701 of FIG. 13). In other words, the transmitting terminal 11 obtains the transmission side terminal number which is the number of transmitting terminals (in this example, the transmitting terminals 12, 13, . . . , and 19) with which its own terminal 11 is able to communicate directly.

Next, the transmitting terminal 11 is on standby until the reception side terminal number signal is received (step S702 of FIG. 13). Then, when the reception side terminal number signal transmitted from the receiving terminal 10 is received, the transmitting terminal 11 determines "Yes," and calculates the hidden terminal number parameter for its own terminal 11 (step S703 of FIG. 13).

Then, the transmitting terminal 11 determines whether or not the return notification signal has been received within a period of time until a certain sixth standby period of time elapses after the reception side terminal number is received in step S702 (step S704 of FIG. 13). According to the above assumption, since the return notification signal has been received, the transmitting terminal 11 determines "Yes," and transmits the parameter signal representing the hidden terminal number parameter for its own terminal 11 (step S705 of FIG. 13).

Meanwhile, the receiving terminal 10 receives the parameter signals transmitted from the indirect transmitting terminals 11, 12, . . . , and 19 (step S603 of FIG. 12). Then, the receiving terminal 10 selects the setting change terminal based on the hidden terminal number parameters (that is, the hidden terminal number parameters for the indirect transmitting terminals 11, 12, . . . , and 19) represented by the received parameter signals (step S604 of FIG. 12).

Next, the receiving terminal 10 transmits the return instruction signal to the selected setting change terminal (step S605 of FIG. 12). Thereafter, the receiving terminal 10 ends the process illustrated in FIG. 12. Note that, in the case that the process proceeds to step S601 of FIG. 12, the receiving terminal 10 does not execute the process of steps S601 to S605 when the maximum value of the hidden terminal number parameters for the direct transmitting terminals 11, 12, . . . , and 19 is equal to or greater than the second target value.

Meanwhile, the transmitting terminal 11 determines whether or not the return instruction signal in which its own terminal 11 is set as the destination has been received within a period of time until a certain seventh standby period of time elapses after the hidden terminal number parameter is transmitted in step S705 (step S706 of FIG. 13).

When the return instruction signal in which its own terminal 11 is set as the destination has been received within the period of time, the transmitting terminal 11 sets its own terminal 11 to execute the direct communication (step S707 of FIG. 13).

However, when the return instruction signal in which its own terminal 11 is set as the destination has not been received within the period of time, the transmitting terminal 11 determines "No," and causes the process to return to step S201 without executing the process of step S707. In other words, in this case, the transmitting terminal 11 maintains the state in which its own terminal 11 is set to execute the indirect communication.

As described above, the wireless communication system 1 according to the fourth embodiment has the same effects as the wireless communication system 1 according to the first embodiment.

Further, the wireless communication system 1 according to the fourth embodiment resets at least one of the indirect transmitting terminals 11, 12, ..., and 19 to execute the direct communication when the maximum value of the hidden terminal number parameters for the direct transmitting terminals 11, 12, ..., and 19 is smaller than a certain second target value.

Meanwhile, when the maximum value of the hidden terminal number parameters for the direct transmitting terminals 11, 12, ..., and 19 is sufficiently small, the state in which the maximum value is relatively small can be maintained even when some of the indirect transmitting terminals 11, 12, ..., and 19 execute the direct communication. Thus, according to the above configuration, it is possible to prevent the number of the transmitting terminals 11, 12, ..., and 19 executing the indirect communication from wastefully increasing while suppressing the occurrence of a collision of radio signals in the receiving terminal 10.

The present invention has been described above with reference to the exemplary embodiments and examples, but the present invention is not limited to the exemplary embodiment. Further, various changes that a person with ordinary skill in the art can understand can be made on the configuration or details of the present invention within the scope of the present invention.

Note that, in the above embodiments, the functions of the wireless terminals 10, 11, ..., and 19 are implemented by executing a program (software) through a processor, but may be implemented by hardware such as a circuit. Further, in the above embodiment, a program is stored in a memory, but a program may be stored in a computer readable recording medium. For example, a recording medium is a portable medium such as a flexible disk, an optical disc, a magneto optical disk, or a semiconductor memory.

Further, in the above embodiment, each of the transmitting terminals 11, 12, ..., and 19 may be used as smart meter such that the transmitting terminal is attached to and combined with a measuring device such as various kinds of meters that are installed in houses or factories or various kinds of meters that measure a natural environment. As described above, the communication efficiency can be increased while avoiding an excessive increase in a load in the wireless communication system 1.

Further, an arbitrary combination of the above embodiments and the modified example may be employed as another modified example of the above embodiments within the scope not departing from the gist of the present invention.

According to a wireless communication system of the present disclosure, it is possible to increase communication efficiency while avoiding an excessive increase in a load.

All examples and conditional language provided herein are intended for the pedagogical purposes of aiding the reader in understanding the invention and the concepts contributed by the inventor to further the art, and are not to be construed as limitations to such for example recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system comprising:
a plurality of wireless terminals constituting a wireless ad hoc network, the plurality of wireless terminals including a receiving terminal and a plurality of transmitting terminals, each of the plurality of transmitting terminals being configured to execute direct communication in which information is transmitted directly to the receiving terminal or indirect communication in which the information is transmitted indirectly to the receiving terminal through at least one other wireless terminal;
a reception side terminal number obtainer that obtains a reception side terminal number which is the number of the wireless terminals with which the receiving terminal is able to communicate directly;
a transmission side terminal number obtainer that obtains a transmission side terminal number which is the number of the wireless terminals with which a target transmitting terminal, which is one of the plurality of transmitting terminals, is able to communicate directly; and
a setter that calculates a hidden terminal number parameter that increases as a hidden terminal number which is the number of the transmitting terminals which are unable to communicate directly with the target transmitting terminal among the transmitting terminals which are able to communicate directly with the receiving terminal increases based on the reception side terminal number and the transmission side terminal number, selects the indirect communication when the hidden terminal number parameter is equal to or greater than a certain threshold value, and sets the target transmitting terminal so as to execute the selected communication.

2. The wireless communication system according to claim 1,
wherein the hidden terminal number parameter is a value obtained by subtracting a value which is obtained by adding "1" to the transmission side terminal number from the reception side terminal number.

3. The wireless communication system according to claim 1,
wherein the hidden terminal number parameter is a value obtained by dividing a value obtained by subtracting a value obtained by adding "1" to the transmission side terminal number from the reception side terminal number by the reception side terminal number.

4. The wireless communication system according to claim 1,
wherein the transmission side terminal number obtainer is configured to obtain the transmission side terminal number for each of direct transmitting terminals set to execute the direct communication among the plurality of transmitting terminals, and
the setter is configured to perform the calculation of the hidden terminal number parameter, the selection of the communication, and the setting of the communication for each of the direct transmitting terminals.

5. The wireless communication system according to claim 4, wherein
the receiving terminal includes a notifier that, when a maximum value of the hidden terminal number parameters for the direct transmitting terminals is equal to or greater than a certain first target value, determines the threshold value, and notifies each of the direct transmitting terminals of the threshold value,
each of the direct transmitting terminals includes a setting executor that sets the direct transmitting terminal to execute the indirect communication when the hidden terminal number parameter for the direct transmitting terminal is equal to or greater than the notified threshold value, and
the setter includes the notifier and the setting executor.

6. The wireless communication system according to claim 5,
wherein the setter is configured to
repeatedly execute the decision of the threshold value, the notification of the threshold value, and the setting of the communication, and
determine a value which is equal to or greater than the first target value and at least does not increase with an increase in the number of times of the repetition as the threshold value.

7. The wireless communication system according to claim 4, wherein
the receiving terminal includes a notifier that selects the wireless terminal to execute the indirect communication based on the hidden terminal number parameter when a maximum value of the hidden terminal number parameters for the direct transmitting terminals is equal to or greater than a certain first target value, and notifies each of the direct transmitting terminals of a terminal identifier identifying the selected wireless terminal,
each of the direct transmitting terminals includes a setting executor that sets the direct transmitting terminal to execute the indirect communication when a wireless terminal identified by the notified terminal identifier is the direct transmitting terminal, and
the setter includes the notifier and the setting executor.

8. The wireless communication system according to claim 4,
wherein the setter is configured to calculate the hidden terminal number parameter for each of indirect transmitting terminals set to execute the indirect communication among the plurality of transmitting terminals, and set the indirect transmitting terminal to execute the direct communication when the hidden terminal number parameter for the indirect transmitting terminal is smaller than a certain second threshold value.

9. The wireless communication system according to claim 4,
wherein the setter is configured to set at least one of indirect transmitting terminals set to execute the indirect communication among the plurality of transmitting terminals to execute the direct communication when a maximum value of the hidden terminal number parameters for direct transmitting terminals set to execute the direct communication among the plurality of transmitting terminals is smaller than a certain second target value.

10. The wireless communication system according to claim 1,
wherein the setter is configured to set a path directly connecting the transmitting terminal with the receiving terminal as a path through which the transmitting terminal transmits the information when the direct communication is selected for the transmitting terminal, and set a path indirectly connecting the transmitting terminal with the receiving terminal through at least one other wireless terminal as a path through which the transmitting terminal transmits the information when the indirect communication is selected for the transmitting terminal.

11. The wireless communication system according to claim 1,
wherein the setter is configured to set transmission power of a radio signal used for the transmitting terminal to transmit the information such that reception power of the radio signal on the receiving terminal is smaller than a value previously set as a lower limit of a communicable range when the indirect communication is selected for the transmitting terminal.

12. A wireless communication method applied to a wireless communication system including a plurality of wireless terminals constituting a wireless ad hoc network, the plurality of wireless terminals including a receiving terminal and a plurality of transmitting terminals, the wireless communication method comprising:
executing, by each of the plurality of transmitting terminals, direct communication in which information is transmitted directly to the receiving terminal or indirect communication in which the information is transmitted indirectly to the receiving terminal through at least one other wireless terminal,
obtaining a reception side terminal number which is the number of wireless terminals with which the receiving terminal is able to communicate directly;
obtaining a transmission side terminal number which is the number of wireless terminals with which a target transmitting terminal, which is one of the plurality of transmitting terminals, is able to communicate directly;
calculating a hidden terminal number parameter that increases as a hidden terminal number which is the number of the transmitting terminals which are unable to communicate directly with the target transmitting terminal among the transmitting terminals which are able to communicate directly with the receiving terminal increases based on the reception side terminal number and the transmission side terminal number;
selecting the indirect communication when the hidden terminal number parameter is equal to or greater than a certain threshold value; and
setting the target transmitting terminal so as to execute the selected communication.

13. The wireless communication method according to claim 12,
wherein the hidden terminal number parameter is a value obtained by subtracting a value which is obtained by adding "1" to the transmission side terminal number from the reception side terminal number.

14. The wireless communication method according to claim 12,
wherein the hidden terminal number parameter is a value obtained by dividing a value obtained by subtracting a value obtained by adding "1" to the transmission side terminal number from the reception side terminal number by the reception side terminal number.

15. The wireless communication method according to claim 12,
wherein the obtaining of the transmission side terminal number includes obtaining the transmission side terminal number for each of direct transmitting terminals set to execute the direct communication among the plurality of transmitting terminals, and
the setting includes performing the calculation of the hidden terminal number parameter, the selection of the communication, and the setting of the communication for each of the direct transmitting terminals.

16. A transmitting terminal that is one of a plurality of transmitting terminals among a plurality of wireless terminals included in a wireless communication system including the plurality of wireless terminals constituting a wireless ad hoc network, the plurality of wireless terminals including a receiving terminal and the plurality of transmitting terminals, the transmitting terminal comprising:
a communication processor that executes direct communication in which information is transmitted directly to the receiving terminal or indirect communication in which the information is transmitted indirectly to the receiving terminal through at least one other wireless terminal;

a transmission side terminal number obtainer that obtains a transmission side terminal number which is the number of the wireless terminals with which the transmitting terminal is able to communicate directly; and a setter that calculates a hidden terminal number parameter that increases as a hidden terminal number which is the number of the transmitting terminals which are unable to communicate directly with the transmitting terminal among the transmitting terminals which are able to communicate directly with the receiving terminal increases based on a reception side terminal number, which is the number of the wireless terminals with which the receiving terminal is able to communicate directly, and the obtained transmission side terminal number, and sets the transmitting terminal to execute the indirect communication when the hidden terminal number parameter is equal to or greater than a certain threshold value.

17. The transmitting terminal according to claim 16, further comprising, a receiver that receives the reception side terminal number from the receiving terminal, wherein the setter is configured to select one of the direct communication and the indirect communication based on the received reception side terminal number and the obtained transmission side terminal number, and set the transmitting terminal to execute the selected communication.

18. A receiving terminal that is one of a plurality of wireless terminals included in a wireless communication system including the plurality of wireless terminals constituting a wireless ad hoc network, the plurality of wireless terminals including the receiving terminal and a plurality of transmitting terminals, the receiving terminal comprising:

a reception side terminal number obtainer that obtains a reception side terminal number which is the number of the wireless terminals with which the receiving terminal is able to communicate directly, each of the plurality of transmitting terminals being configured to execute direct communication in which information is transmitted directly to the receiving terminal or indirect communication in which the information is transmitted indirectly to the receiving terminal through at least one other wireless terminal;

a transmitter that transmits the obtained reception side terminal number to each of the wireless terminals with which the receiving terminal is able to communicate directly; and a notifier that, when a maximum value of hidden terminal number parameters for direct transmitting terminals set to execute the direct communication among the plurality of transmitting terminals is equal to or greater than a certain first target value, notifies each of the direct transmitting terminals of information used for selecting one of the direct communication and the indirect communication, each of the hidden terminal number parameters increasing as a hidden terminal number which is the number of the transmitting terminals which are unable to communicate directly with a target transmitting terminal among the transmitting terminals which are able to communicate directly with the receiving terminal increases based on the obtained reception side terminal number and a transmission side terminal number which is the number of the wireless terminals with which the target transmitting terminal, which is one of the plurality of transmitting terminals, is able to communicate directly.

\* \* \* \* \*